United States Patent [19]

Hirota

[11] Patent Number: 5,130,788
[45] Date of Patent: Jul. 14, 1992

[54] SHADING CORRECTION USING FIFO MEMORY FOR CORRECTION DATA

[75] Inventor: Yoshihiko Hirota, Osaka, Japan

[73] Assignee: Minolta Camera Kabushiki Kaisha, Osaka, Japan

[21] Appl. No.: 784,125

[22] Filed: Oct. 29, 1991

Related U.S. Application Data

[60] Continuation of Ser. No. 528,609, May 25, 1990, abandoned, which is a division of Ser. No. 197,833, May 23, 1988, Pat. No. 4,945,405.

[30] Foreign Application Priority Data

| Date | Country | Number |
|---|---|---|
| May 21, 1987 | [JP] Japan | 62-126819 |
| May 21, 1987 | [JP] Japan | 62-126820 |
| May 21, 1987 | [JP] Japan | 62-126821 |
| May 21, 1987 | [JP] Japan | 62-126822 |
| May 21, 1987 | [JP] Japan | 62-126823 |
| Jun. 17, 1987 | [JP] Japan | 62-153126 |
| Jun. 17, 1987 | [JP] Japan | 62-153127 |
| Jun. 17, 1987 | [JP] Japan | 62-153128 |
| Jun. 17, 1987 | [JP] Japan | 62-153129 |

[51] Int. Cl.⁵ .................................. H04N 1/46
[52] U.S. Cl. ........................... 358/75; 358/461
[58] Field of Search ................. 358/75, 163, 461

[56] References Cited

U.S. PATENT DOCUMENTS

| | | | |
|---|---|---|---|
| 4,745,466 | 5/1988 | Yoshida et al. | 358/80 |
| 5,001,768 | 3/1991 | Mita et al. | 358/461 X |

Primary Examiner—James J. Groody
Assistant Examiner—Mark R. Powell
Attorney, Agent, or Firm—Burns, Doane, Swecker & Mathis

[57] ABSTRACT

A color image read apparatus which makes efficient color balance correction and shading correction by a simple configuration in a manner that color balance correction of image signals of plural colors of a color image sensor using optoelectric transducers is made in A/D conversion on the basis of a reference voltage for each color, and shading correction thereof is made on the basis of one reference data obtained from image signals of plural colors of a reference white pattern read prior to an original.

4 Claims, 31 Drawing Sheets

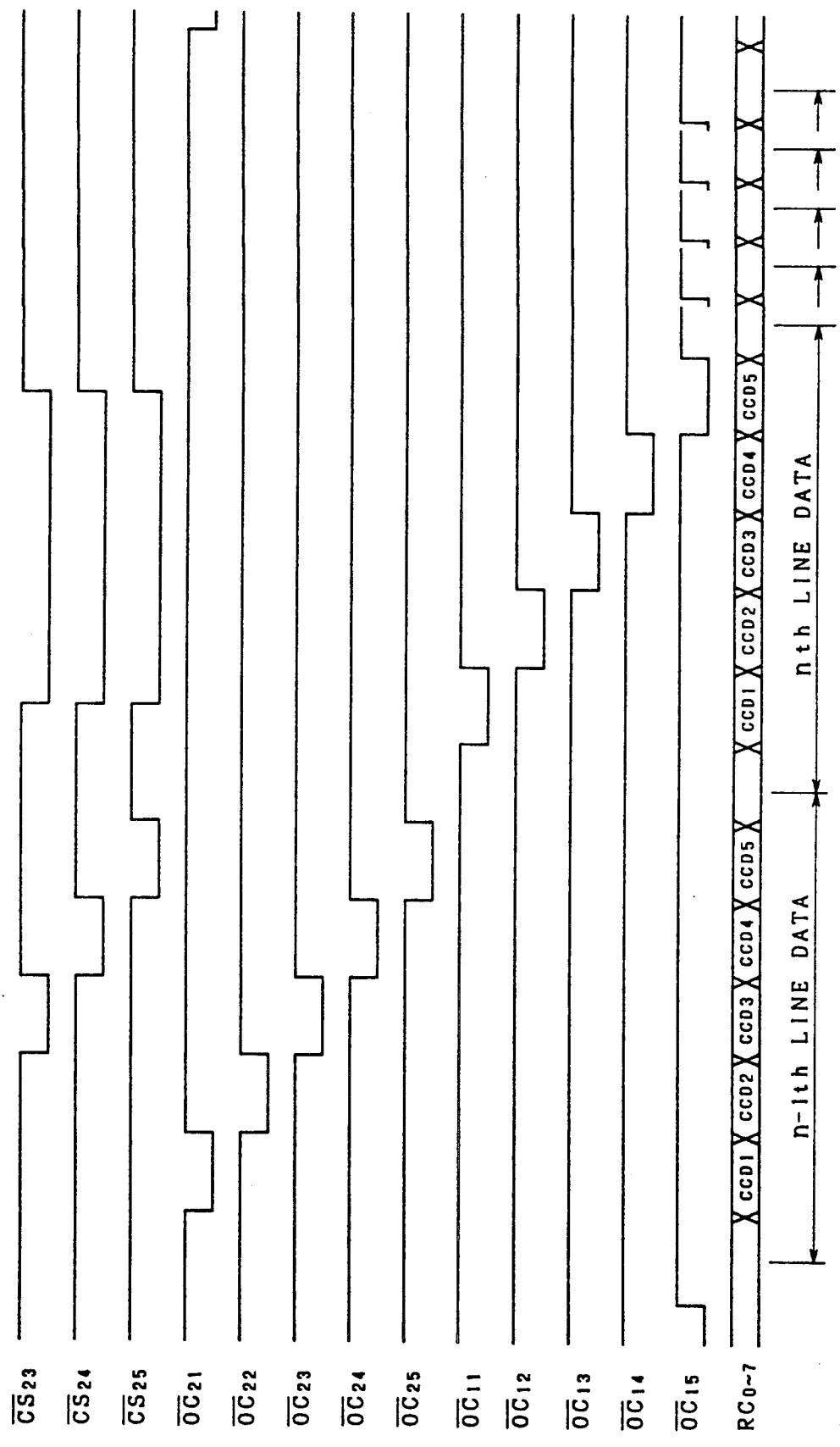

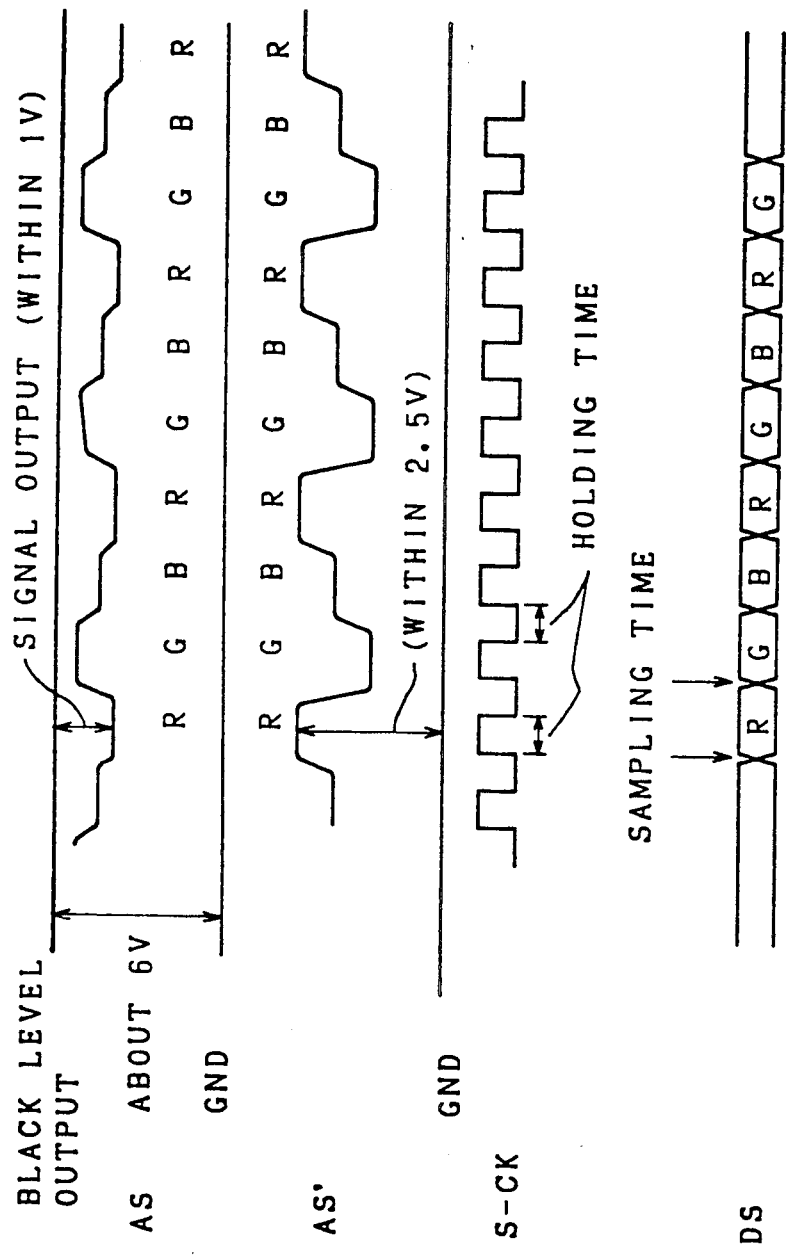

SHADING CORRECTION USING FIFO MEMORY FOR CORRECTION DATA

This application is a continuation of application Ser. No. 07/528,609, filed May 25, 1990, now abandoned, which is a divisional of application Ser. No. 07/197,833, filed on May 23, 1988, now U.S. Pat. No. 4,945,405.

BACKGROUND OF THE INVENTION

1. Field of the Invention

The present invention relates to a color image read apparatuss reading an original image by decomposing it into plural color signals by photoelectric conversion, and to be further detailed, relates to a color image read apparatus which performs data corrections such as shading correction and color balance correctino and binary coding for image data having been read.

2. Description of the Prior Art

A color image read apparatus reads a color image of an original by decomposing it into the three primary colors of light (red(r), green(B) and blue(B)) using a CCD sensor which is an optoelectric transducer and filters. Then it converts analog outputs of the respective colors of the linear CCD sensor into digital values using A/D converters, subsequently makes shading correction for correcting nonuniformity of the quantity of light irradiated on one line of the original and dispersion of the sensitivities of CCD chips configurating a linear CCD sensor and gamma correction for producing an input-output relation matching with characteristics of a data outputting apparatus, and thereafter performs binary coding by a predetermined system. The color image thus read is sent to a data outputting apparatus (for example, a printer or CRT).

Generally, in the color image read apparatus, the spectral distribution characteristics of a light source (for example, a fluorescent lamp) used for scanning of an original are not the same in balance of the light intensities at the respective wavelengths of the three primary colors of light, R, G and B. Also, the filters for R, G and B (for example, vacuum-evaporated on the surface of a linear CCD sensor being an optoelectric transducer) have not the same sensitivity to the respective R, G and B. For this reason, even if a white pattern having a certain density is read, the respective signal outputs of R, G and B are not uniform, for example, resulting in ratios of R: G: B=5:4:3. Therefore correction for color balance is required to be made.

Conventionally, the correction of color balance has been made using a shading correcting circuit with differences in the above-described signal outputs taken as dispersion of picture elements. In this case, the system of making correction for every data of one bit of the optoelectric transducer inputted sequentially in the order of R, G and B and the system provided with shading correcting circuits of the respective three primary colors R, G and B are generally employed.

In the system which makes a correction of color balance using one shading correcting circuit, the range of shading correction is required to be set so as to be able to correct up to a signal output of about 30–40% of a maximum signal output, and therefore the reliability of data shading-corrected is reduced remarkablyd. Also, only one shading correcting circuit is used for all signals of R, G and B, and correction data to the respective colors R, G and B have to be put beforehand in a table of a ROM in the shading correcting circuit. This means that a deficiency is produced that a large capacity of data is required to be stored in advance.

Also, the system using three shading correcting circuits has a deficiency that the scale of the circuit is made larger.

SUMMARY OF THE INVENTION

The present invention has been achieved to solve the above-described problems in the prior art, and a first object of the present invention is to provide a color image read apparatus capable of performing an efficient data correcting processing.

A second object of the present invention is to provide a color image read apparatus capable of making an efficient shading correction by a simplified configuration.

A third object of the present invention is to provide a color image read apparatus capable of making an efficient color balance correction by making the color balance correction before the shading correction.

The above and further objects and features of the invention will more fully be apparent from the following detailed description with accompanying drawings.

BRIEF DESCRIPTION OF THE DRAWINGS

FIG. 212 is a block diagram showing a configuration of a shading correcting part of a second embodiment of the color image read apparatus in accordance with the present invention, FIG. 25 is a timing chart showing a relationship between an analog signal and a digital signal obtained by A/D-converting it.

DESCRIPTION OF THE PREFERRED EMBODIMENTS

Hereinafter, description is made on embodiments in accordance with the present invention in reference to the accompanying drawings.

(a) A CCD sensor and an image read apparatus

Figure 1:
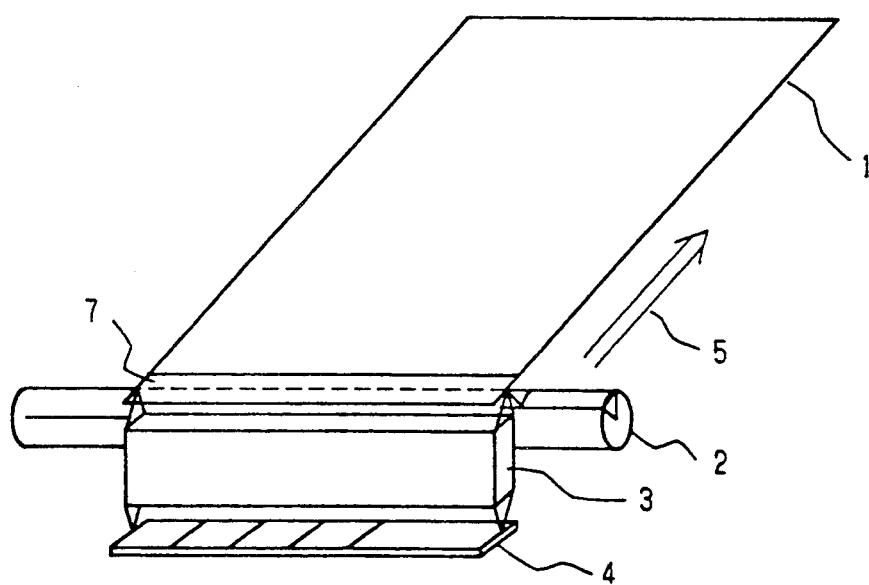
FIG. 1 is a fragmental perspective view showing a configuration of one embodiment of a color image read apparatus in accordance with the present invention, FIG. 2($a$) is a schematic plan view of a CCD sensor used for the present invention, FIG. 2($b$) is a fragmental magnified view of FIG. 2($a$)

FIG. 1 is a fragmental perspective view showing a configuration of a color image read apparatus in accordance with the present invention.

In the color image read apparatus, the surface of an original 1 is irradiated by a light source (fluorescent lamp) 2 having a spectral distribution of three wavelenghts of red (R), green (G) and blue (B), and the reflected light is made to produde an equi-magnified image in a linear shape on a photoreceptor surface of a CCD sensor by a rod lens array 3. An optical system comprising the rod lens array 3, the light source 2 and the CCD sensor 4 is line-scanned in the direction as shown by an arrow 5, and light information of the original 1 is photoelectrically converted by the CCD sensor 4. The CCD sensor 4 is a tight-contact type line CCD sensor with built-in memory which decomposes a color original into the three primary colors of R, G and B to perform photoelectric conversion.

Figure 2A:
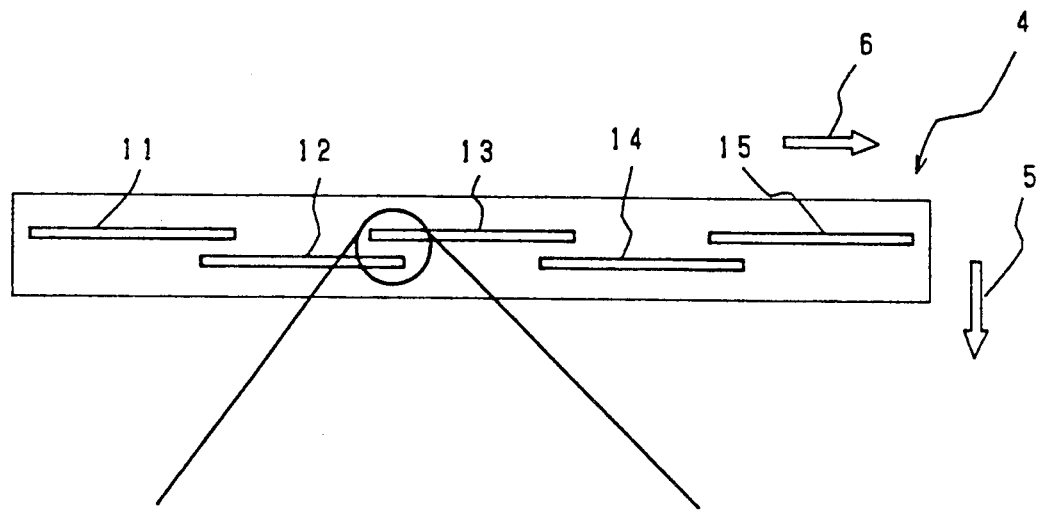
Figure 2B:
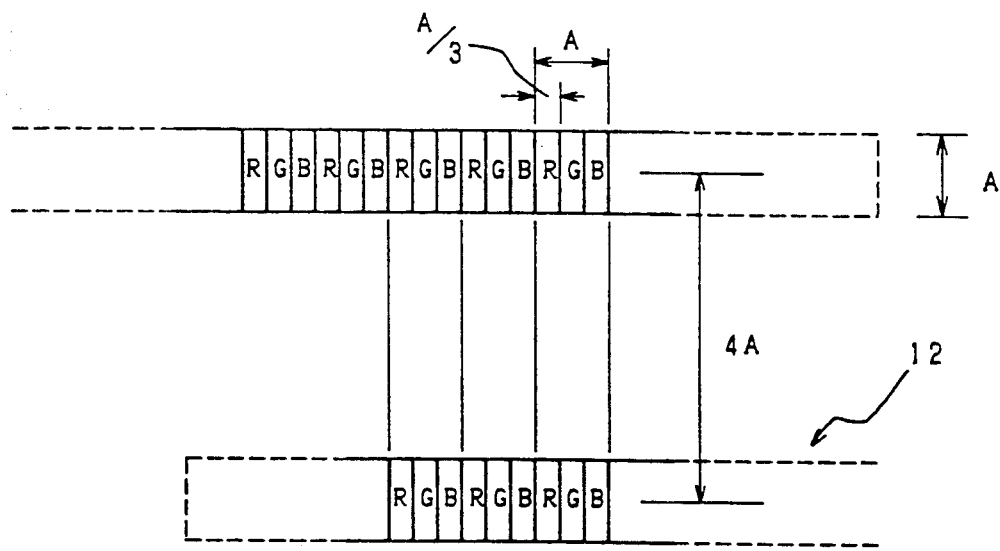

FIG. 2($a$) is a schematic plan view of the CCD sensor 4, and FIG. 2($b$) is a fragmental magnified view of FIG. 2 ($a$). The CCD sensor 4 has five pieces of CCD sensor chips 11-15 which is provided with 3072 dots of effective read picture elements respectively and are arranged in zigzag shape in the main scanning direction 6 shown by a white arrow, and can read an A3 original with a resolution of 16 lines/mm. The respective CCD sensor chips 11-15 divide one dot of print output picture element in three parts in the main scanning direction 6, and each picture element is provided with filters of the primary three colors of R, G and B formed by vacuum evaporation.

The CCD sensor chips 11-15 arranged in a zigzag shape are coupled in a row in the subscanning direction 5 alternately with a picture element pitch (4A) of four dots. To perform a high-speed read, respective signal outputs $OS_1$-$OS_5$ of the CCD sensor chips 11-15 are outputted in a parallel fashion.

Figure 3:
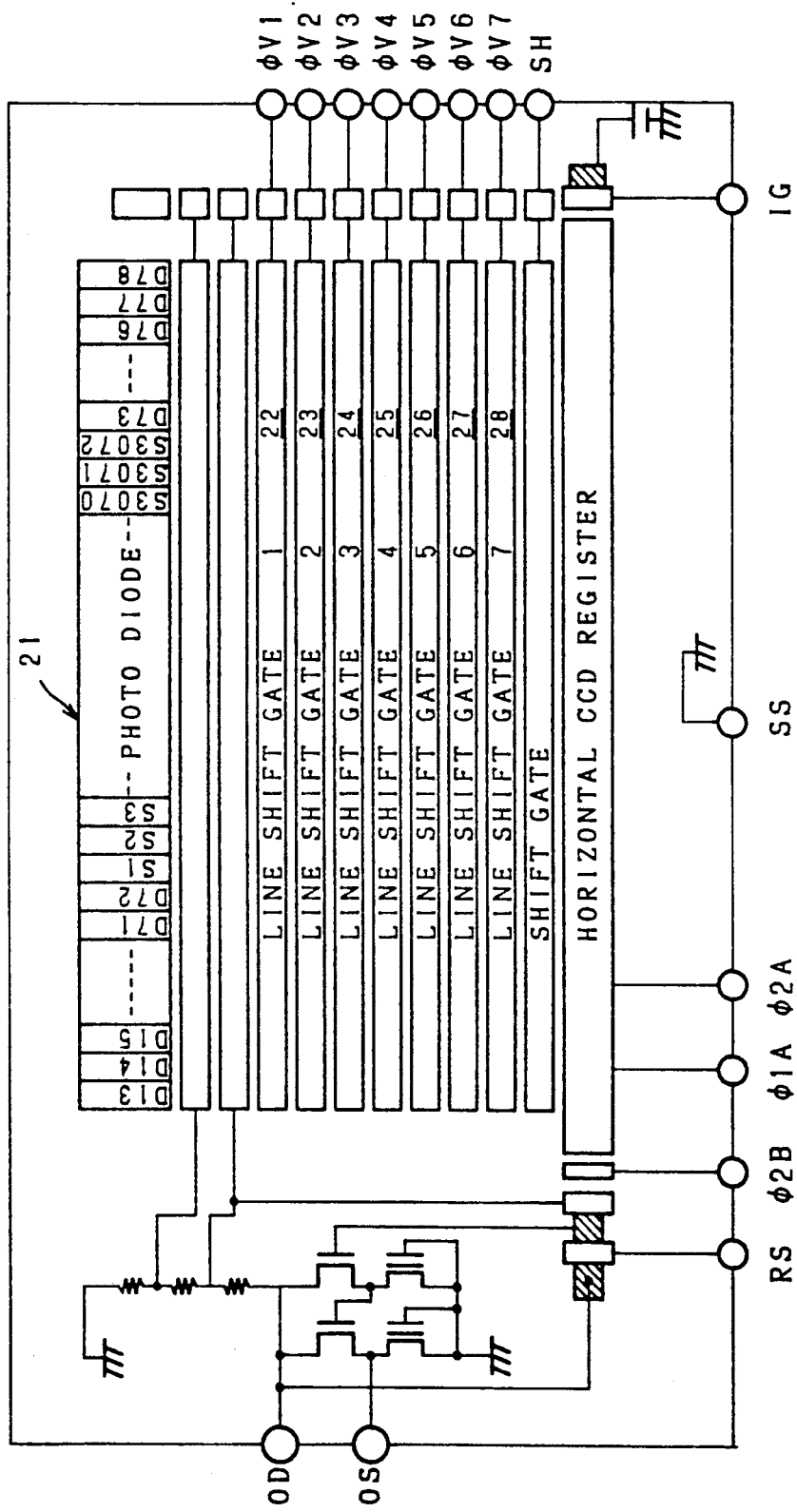
FIG. 3 is a block diagram showing a configuration of a CCD sensor chip.

FIG. 3 is a block diagram showing a configuration of the respective CCD sensor chips 11-15, and the CCD sensor chips 11-15 is provided with 3072 pieces of effective picture elements (S1-S3072) 21 which are arranged in a row, and dummy picture elements (D13-D72 and D73-D78) are disposed on the both sides of the row. These CCD sensor chips 11-15 incorporate a memory, and one-line data is stored in each of seven line shift gates 22-28. Original information of the line of the same position is obtained by delaying the signal outputs $OS_2$ and $OS_4$ of the CCD chips 12 and 14 by four picture elements by means of timings of pulses $\phi V_1$-$\phi V_7$ applied to the line shift gates 22-28 (refer to FIG. 4).

Figure 4:
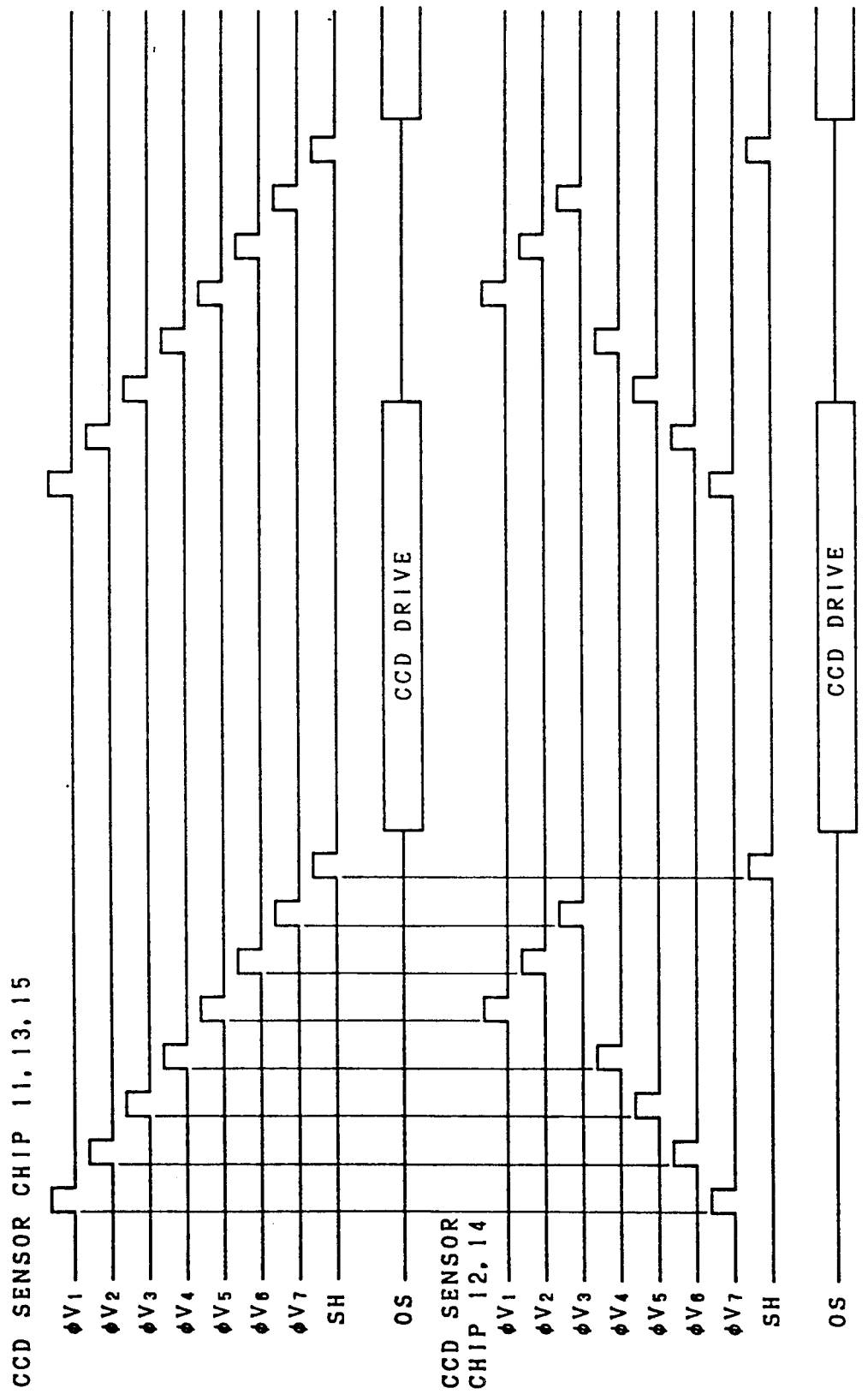
FIG. 4 is a timing chart showing timings of pulses $\phi V_1 - \phi V_7$ applied to a line shift gate.

FIG. 4 is a timing chart showing timings of the pulses $\phi V_1$-$\phi V_7$ applied to the respective line shift gates. By shifting the timings of $\phi V_1$-$\phi V_7$ between the CCD sensor chips 11, 13 and 15 and the CCD sensor chips 12 and 14, the signal outputs of the CCD sensor chips 12 and 14 are delayed by four picture elements, and the data of the line of the same position is obtained.

Figure 5:
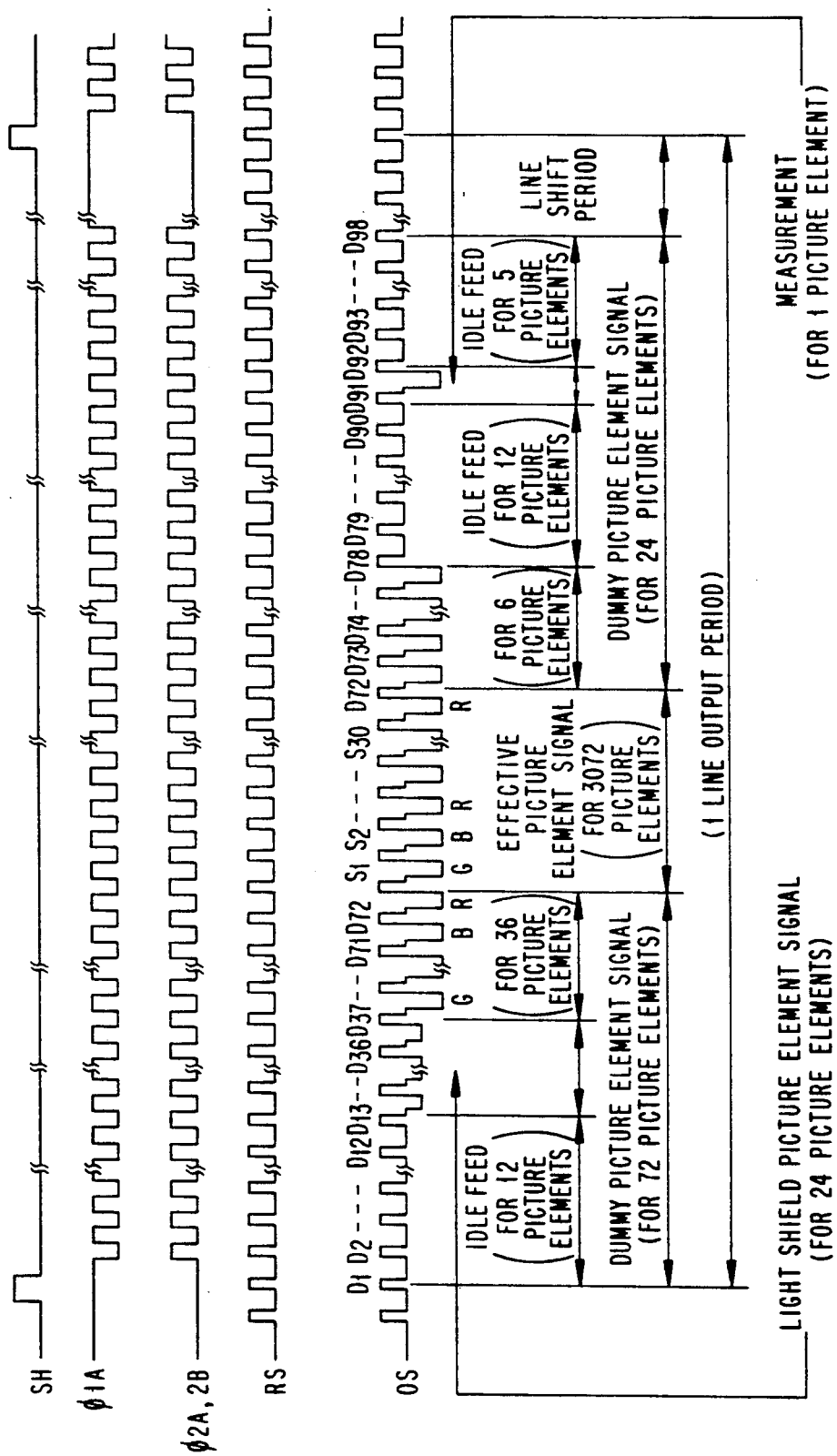
FIG. 5 is a timing chart showing drive timing of each sensor chip.

FIG. 5 is a timing chart showing drive timing of each CCD sensor chip. The CCD sensor 4 is required to input a total of 12 kinds of pulses to each of the CCD sensor chips 11-15; pulses $\phi V_1$-$\phi V_7$, a shift pulse SH, and signals $\phi 1A$, $\phi 2A$, $\phi 2B$ and RS. Each of the CCD sensor chips 11-15 inputs pulses of quite the same timing except for the pulses $\phi V_1$-$\phi V_7$ to output the signals in parallel. The outputs of the signals are started by the shift pulse SH By applying the signals $\phi 1A$, $\phi 2a$, $\phi 2B$ and RS, the signal output OS is obtained in synchronism with the signal RS.

Figure 6:
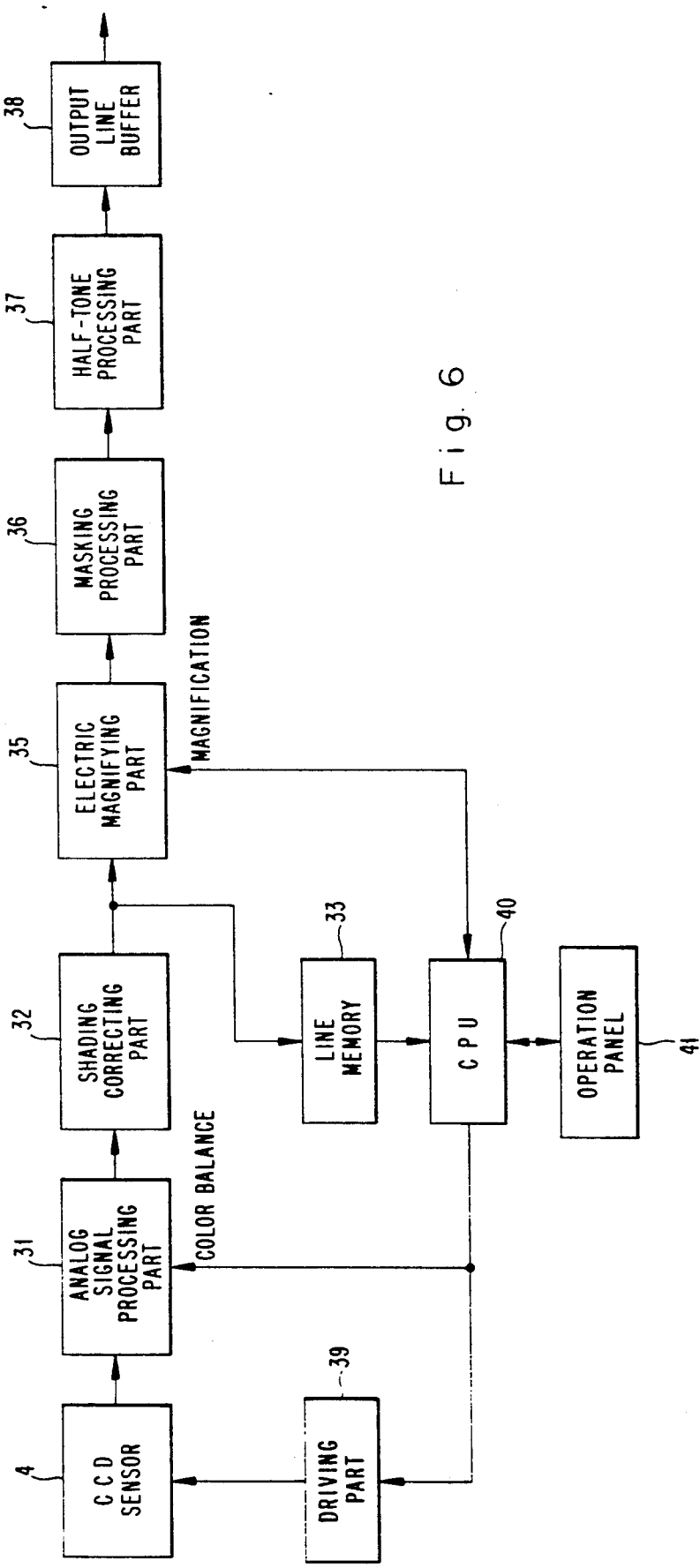
FIG. 6 is a block diagram showing a configuration of a color image read apparatus of the present invention.

FIG. 6 is a block diagram showing a configuration of a color image read apparatus, and this color image read apparatus repeats line scanning on the original surface three times, sequentially converts color information of R, G and B decomposed in reading on one scanning basis into print data C, M and Y corresponding to print colors cyan, magenta andd yellow, and send them to an outputting apparatus. This means that the CCD sensor 4 convertes light information of R, G or B of one line of the original into an electric signal, and outputs it sequentially on a picture elements basis. This electric signal is converted into a digital value by an analog signal processing part 31, undergoes shading correction by a shading correcting part 32, and is stored temporarily in a line memory 33. The data stored in the line memory 33 is electrically magnified by an electric magnifying part 35 in correspondence to a predetermined magnification, undergone masking processing in a masking processing part 36, and thereafter is binary-digitized by a predetermined system in an half-tone processing part 37. Then, it is sent to an outputting apparatus such as a printer through an output line buffer 38.

The CCD sensor 4 is driven by the signals SH, $\phi$1A, $\phi$2A, $\phi$2B, RS and $\phi V_1$–$\phi V_7$ and the like generated by a driving part 39. Also, a CPU40 gives drive timing to the driving part 39, gives a signal for setting color balance to the analog signal processing part 31, and gives data of magnification set by an operation panel 41 to the electric magnifying part 35.

Figure 7:
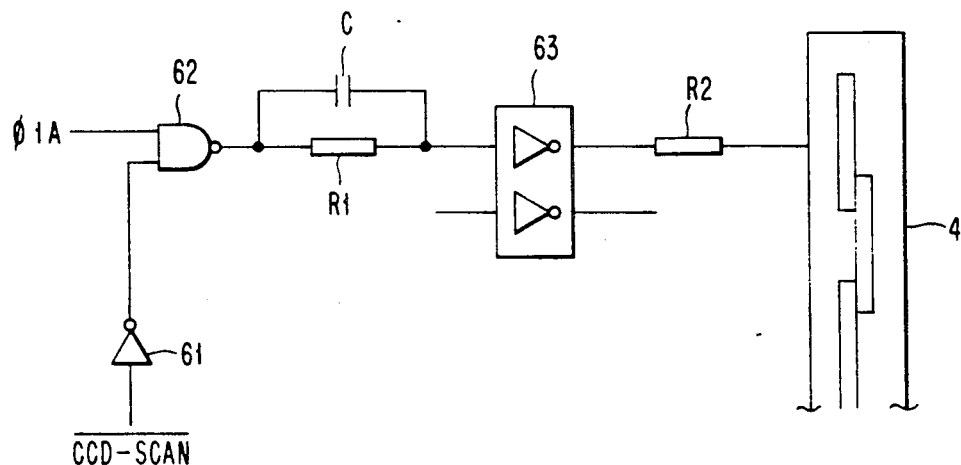
FIG. 7 is a circuit diagram showing a part of a driving part of a CCD sensor.

FIG. 7 is a circuit diagram showing part of the driving part 39, and the CPU40 sends a $\overline{\text{CCD-SCAN}}$ signal to the driving part 39. This $\overline{\text{CCD-SCAN}}$ signal goes active until the CCD sensor 4 completes scanning in the case where a main switch is depressed on the operation panel 41 and a scanning button is depressed, that is, where scanning is performed. Also, the $\overline{\text{CCD-SCAN}}$ signal goes active even if scanning is directed to the color image read apparatus from an external host apparatus. Furthermore, this signal can be made active all the time also when the test mode is set by depressing a test key for conducting test besides the case of printing.

This $\overline{\text{CCD-SCAN}}$ signal is inputted to a NAND gate 62 through an inverter 61. A drive pulse signal $\phi$1A (refer to FIG. 3) generated by the driving circuit 39 is also inputted to this NAND gate 62. Accordingly, the signal $\phi$1A is sent to the next through the NAND gate 62 only when the $\overline{\text{CCD-SCAN}}$ signal is active. An output signal of the NAND gate 62 is sent to a driver 63 through a parallel circuit of a capacitor C and a resistor R1 for speeding up.

This driver 63 for driving CCD is used because pulse terminals of the CCD sensor 4 have large capacities, and incorporates two pieces of inverters converting a pulse of 5 V level into a pulse of +12 V level. (When only one inverter is used, the temperature rise of the driver 63 can be reduced in comparison with the case where the both inverters are used.) The temperature rise of this driver 63 is remarkably large depending upon the frequency of inputted pulse and the capacity of the driver terminal, and therefore the $\overline{\text{CCD-SCAN}}$ signal is received at a NAND gate of the preceding stage to suppress the temperature rise of the driver 63.

An output signal of the driver 63 is inputted to a $\phi$1A pulse terminals of the CCD sensor 4 through a damping resistor R2 corresponding to the terminal capacity.

Since the driving circuit 39 is configured as described above, the drive pulse is inputted to the CCD sensor 4 and the driver 63 is operated only in the read mode or in the test mode. Accordingly, the temperature rise of the CCD sensor 4 is reduced and the S/N ratio can be prevented from deterioration.

Figure 8:
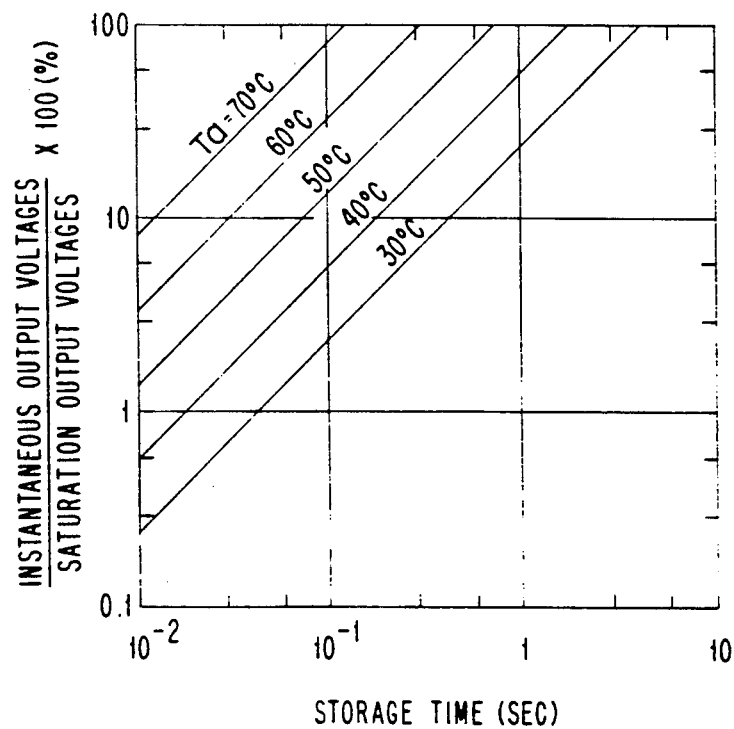
FIG. 8 is a graph showing temperature characteristics of instantaneous output voltages of the CCD sensor.

FIG. 8 is a graph of temperature characteristics of instantaneous output voltages of the CCD sensor 4. The ordinate represents the ratio (%) of instantaneous output voltages to the saturation output voltage, and the abscissa represents the storage time. It is found that the S/N ratio increases with rise in temperature. Accordingly, it is desirable to reduce the temperature.

(b) Digitalizing processing and color balance correction of image signal output

Figure 9:
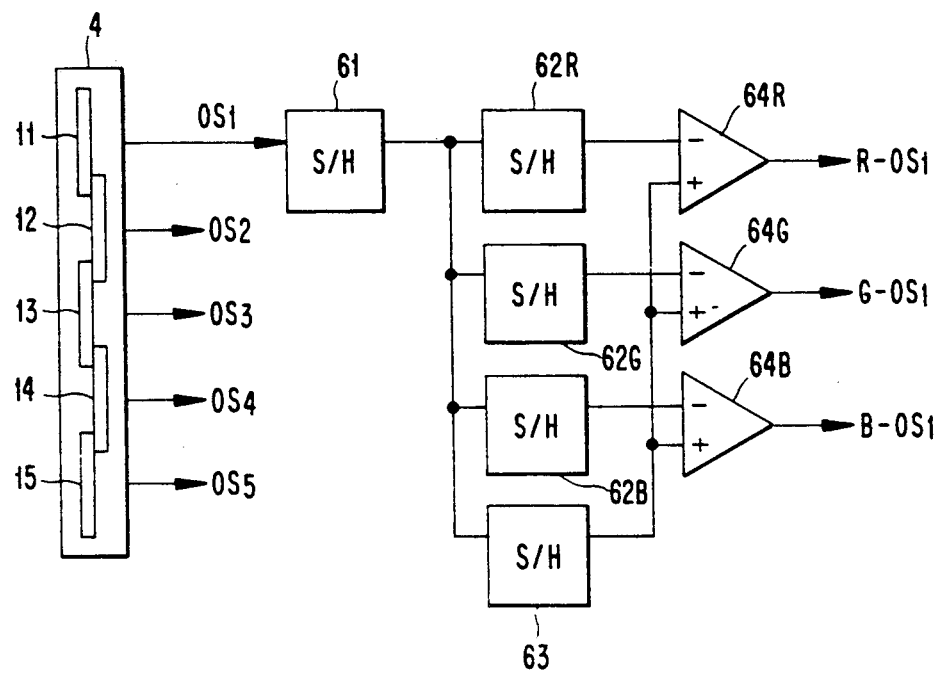
FIG. 9 is a circuit diagram showing a part of an analog signal processing part.
Figure 12:
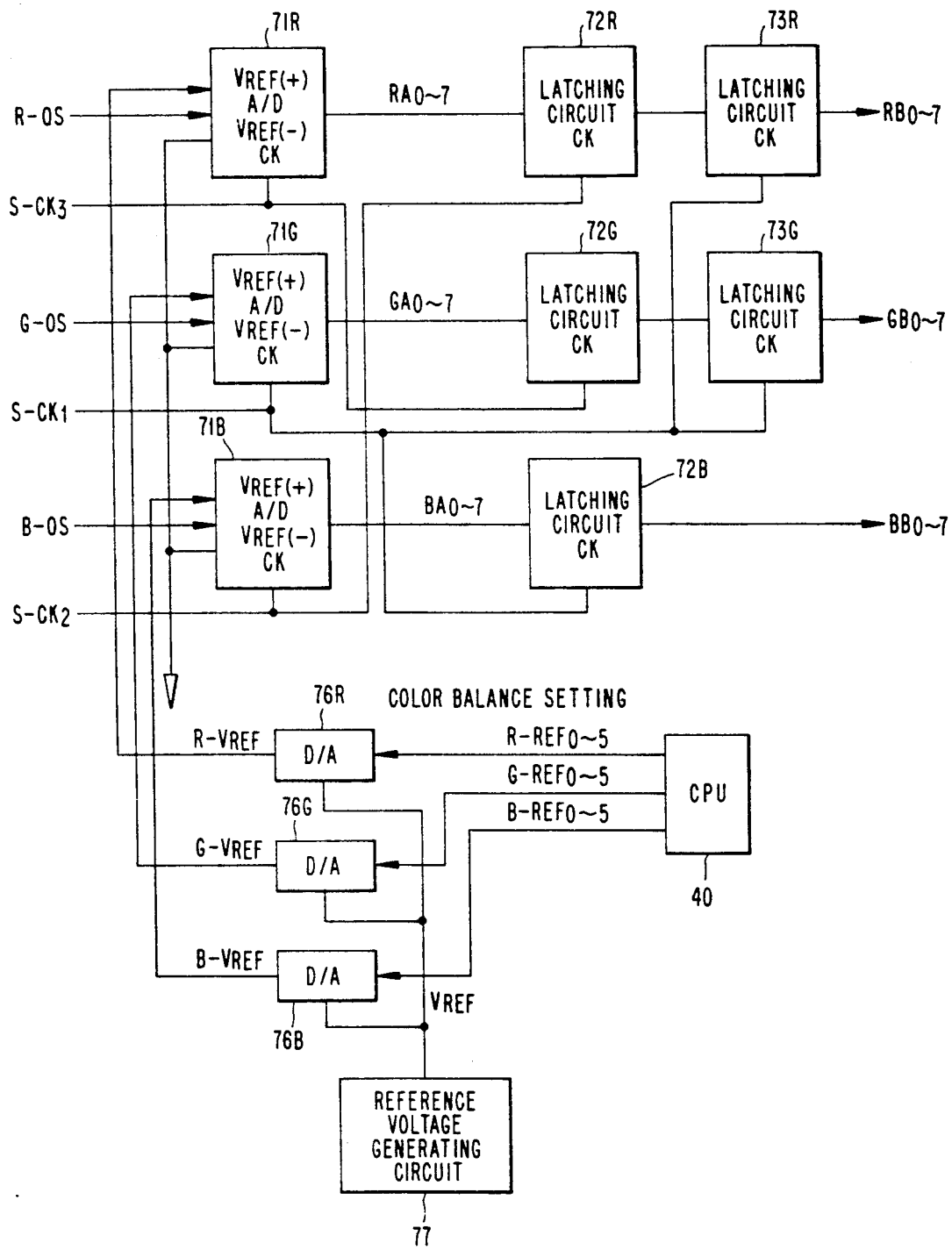
FIG. 12 is a circuit diagram showing a part of A/D conversion of the analog signal processing part.

FIG. 9 is a circuit diagram showing a part of the analog signal processing part, and the signal outputs $OS_1$–$OS_5$ of the respective CCD sensor chips 11–15 are decomposed into three colors respectively in an independent fashion by the analog signal processing part 31 shown in FIG .9 and FIG. 12. The reason why the signals $OS_1$–$OS_5$ are not amplified intact is that the offset voltage is large as described below.

Figure 10:
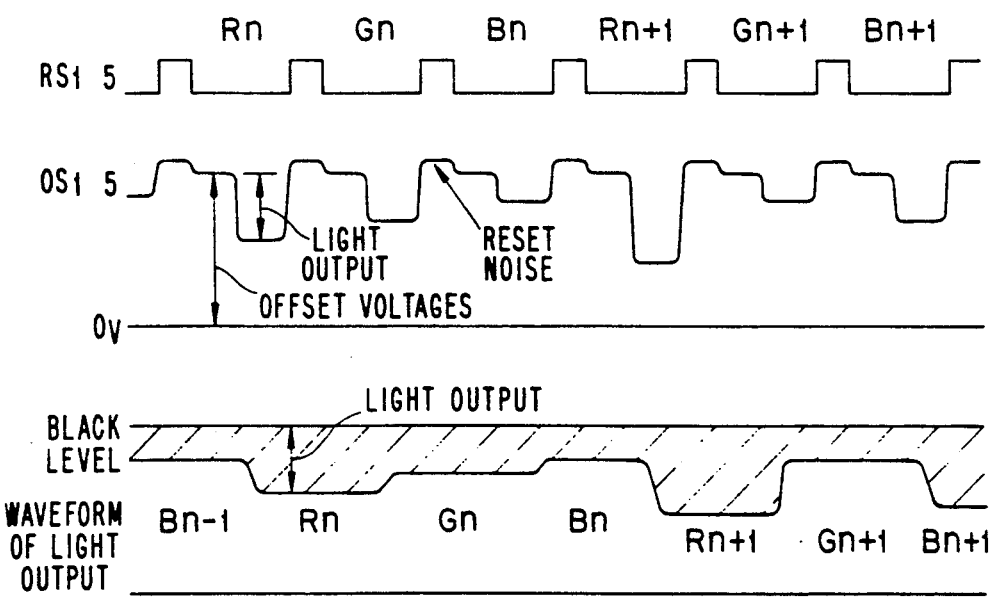
FIG. 10 is a waveform graph showing relationships between before and after waveform shaping of signal outputs of the CCD sensor.

FIG. 10 is a waveform graph explaining the state of the signal outputs of the CCD sensor.

As shown in FIG. 10, the signal outputs $OS_1$–$OS_5$ are outputted respectively in synchronism with pulses $RS_1$–$RS_5$ during the period of one-line output (refer to FIG. 5). Out of the signal outputs $OS_1$–$OS_5$, effective picture element signals are amplified in the negative direction corresponding to the intensity of incident light as shown in the graph, and contain the reset noise and the offset noise of about 5–6 V. The saturation voltage (maximum amplitude voltage) of light output is about 1 V. On the other hand, a light shield picture element signal showing the black level voltage of each sensor chip is outputted before the effective picture element signal (refer to FIG. 5).

Since the offset voltage is large as shown above, it is difficult to directly digitalize the signal outputs $OS_1$–$OS_5$ of the CCD sensor chips 11–15.

Figure 11:
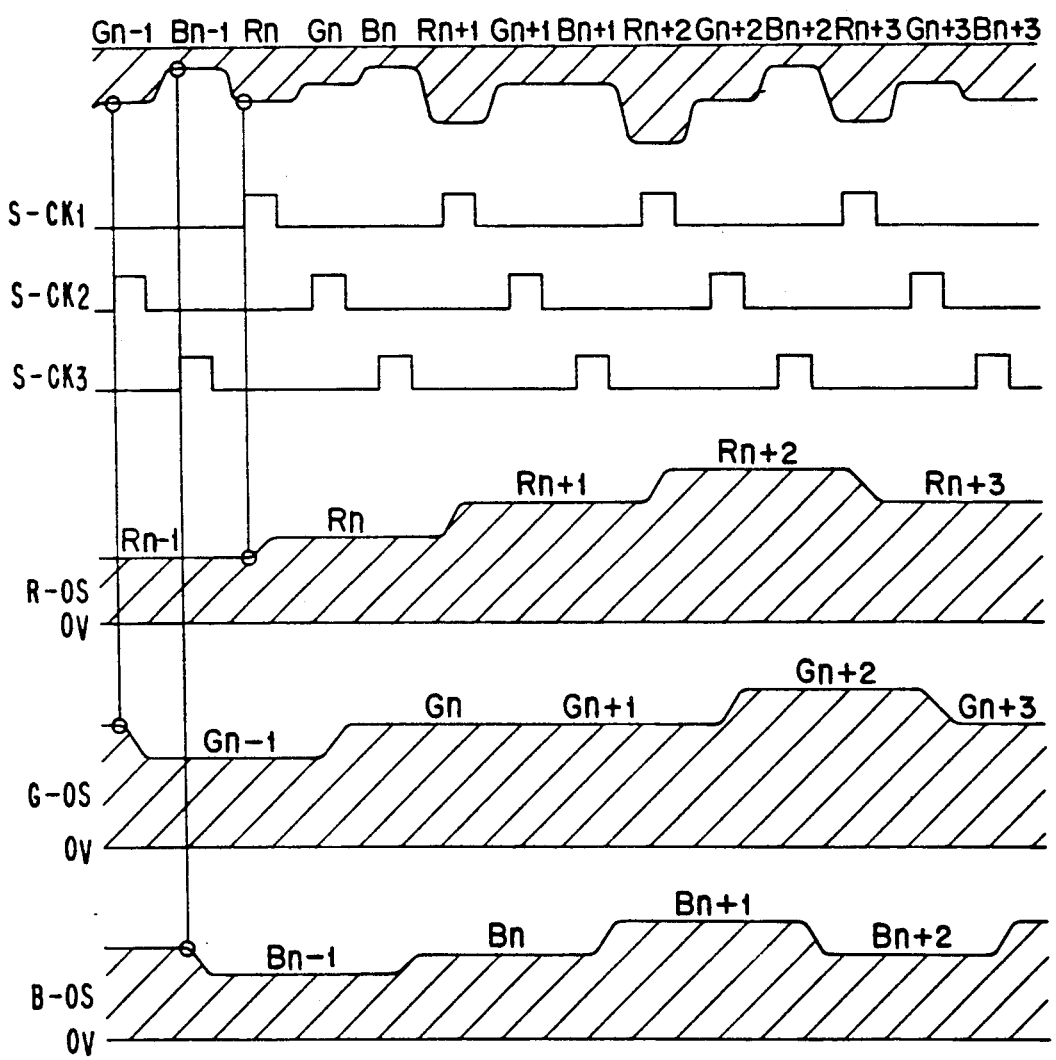
FIG. 11 is a waveform graph showing relationships of serial/parallel conversions of the signal output.

Then, the analog signal processing circuit shown in FIG. 9 is used. In the figure, only the analog signal processing circuit of the signal output $OS_1$ is shown, but the other signal outputs $OS_2$–$OS_5$ are processed separately by similar circuits. First, to eliminate the reset noise of the signal output $OS_1$, waveform shaping of the signal output $OS_1$ is performed by the sample holding circuit 61 (refer to a waveform in the bottom of FIG. 10). In the signal output $OS_1$, analog signals are transmitted in a serial fashion in the order of R, G and B, and these are converted into parallel signal lines by sample holding circuits 62R, 62G and 62B. FIG. 11 is a waveform graph showing a relationship of serial/parallel conversions of the signal outputs. As shown in FIG. 11, inputted analog signals are sampled in sequence by the "H"-level signals of clocks S-CK 1, 2 and 3 inputted to the sample holding circuits 62R, 62G and 62B, and are held by the "L"-level signals. On the other hand, the sample holding circuit 63 holds the above-described light shield picture element signal (black-level voltage) on a one line basis. Amplifier circuits 64R, 64G and 64B respectively perform differential amplification between the output signals of the sample holding circuits 62R, 62G and 62B, that is, the respective read signals of R, G and B and the black-level signal outputted from the sample holding circuit 63. This means that the offset voltage is eliminated, the amplitudes of signals are amplified by about three times in the positive direction, and thereby amplified image signals $R-OS_1$, $G-OS_2$ and $B-OS_1$ are obtained.

FIG. 12 is a circuit diagram showing a part of an A/D converter circuit of the analog processing part. As shown in FIG. 12, these amplified image signals $R-OS_1$, $G-OS_1$ and $B-OS_1$ are converted into eight-bit digital data $RA_{0-7}$, $GA_{0-7}$ and $BA_{0-7}$ corresponding to timings of the clocks S-CK3, S-CK1 and S-CK2 by A/D converters 71R, 71G and 71B. At this time, as described later, correction of color balance is performed.

The digital data $RA_{0-7}$, $GA_{0-7}$ and $BA_{0-7}$ of the respective A/D converters 71Rf, 71G and 71B are outputted with a phase shift of $\frac{1}{3}$ period, respectively. Then, the digital data $RA_{0-7}$, $GA_{0-7}$ and $BA_{0-7}$ are latched respectively in latching circuits 72R, 72G and 72B at timings of the clocks S-CK2, S-CK3 and S-CK1, and further the output data of the latching circuits 72R and 72G are latched in latching circuits 73R and 73G at the timing of S-CK1. Thereby, the latching circuits 73R, 73G and 72B output digital data $RB_{0-7}$, $GB_{0-7}$ and $BB_{0-7}$ respectively without phase shifting.

The color balance correctin of the A/D converters 71R-71B is made by setting the upper limit value of a reference voltage (the lower limit value is fixed to GND voltage).

Figure 13:
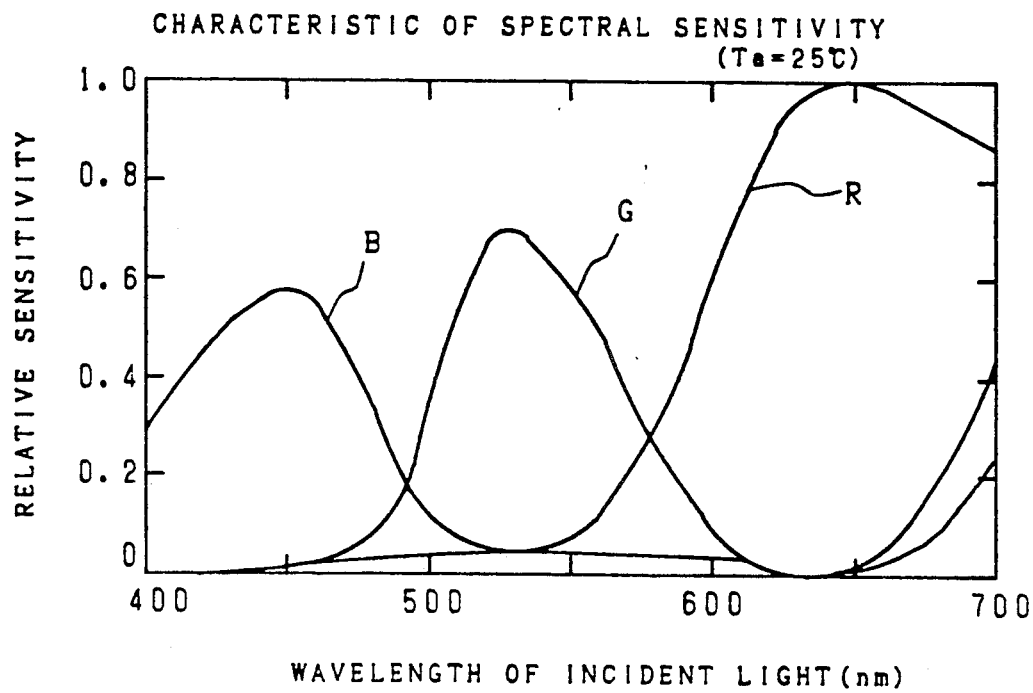
FIG. 13 is a graph showing the spectral sensitivities of white light of the CCD sensor.
Figure 14:
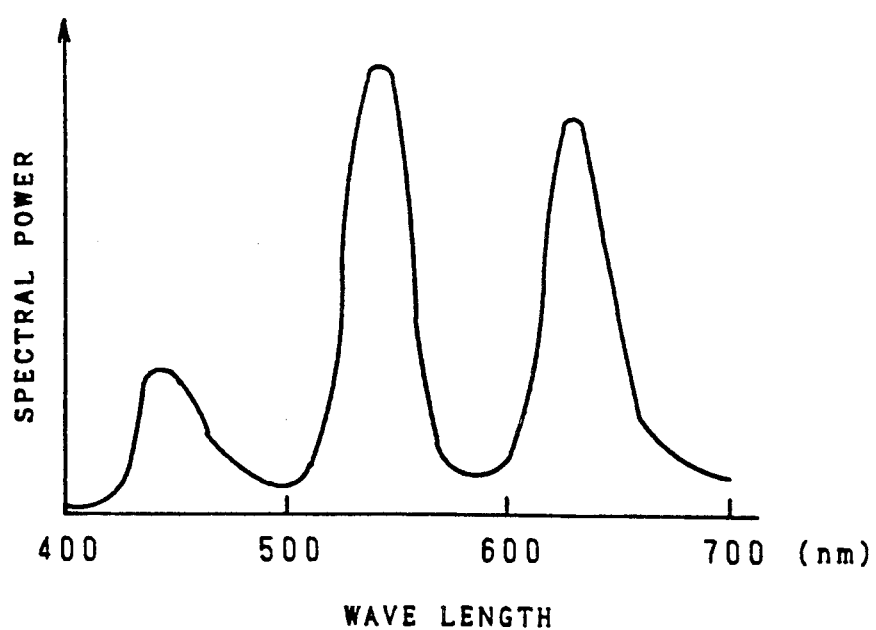
FIG. 14 is a graph showing spectral distribution characteristics of a light source.

FIG. 13 is a graph showing the spectral sensitivities of white light of the CCD sensor, and the ordinate represents the relateive sensitivity and the abscissa represents the wavelength of incident light (nm). FIG. 14 is a graph showing spectral distribution characteristics of a light source, and the ordinate represents the spectral power and the abscissa represents the wavelength (nm) of the light source.

The reason why the color balance correctino is required is that even if the CCD sensor 4 reads a white original having a uniform density, the image signals decomposed into the colors R, G and B have not the same output, as shown in FIG. 13. Furthermore, as shown in FIG. 14, this is because the spectral distribution characteristics of a fluorescent lamp which is the light source 2 are not the same for R, G and B.

Setting of color balance is performed by the following procedures.

(1) when an image input device starts scanning, the CPU40 outputs the data of maximum value, that is 3F(HEX) to D/A converters 76R, 76G and 76B and reference voltage $V_{REF}$ outputted by a refernce voltage generating circuit 77 is inputted directly to $V_{REF}(+)$ terminals of A/D converters 71R, 71G and 71B. In this state, reference white pattern 7 of uniform density is read, the respective digital data of R, G and B is stored in a line memory 33 for one line.

(2) CPU40 reads data out of each line memory of R, G and B and the maximum value of each decomposed digital data is detected.

(3) CPU40 newly sets from the detected maximum value data of 6 bits of $R\text{-}REF_{0-5}$, $G\text{-}REF_{0-5}$ and $B\text{-}REF_{0-5}$ in a range of no-overflow of $RA_{0-7}$, $GA_{0-7}$ and $BA_{0-7}$ and delivers the data to each D/A converter 76R, 76G and 76B.

(4) The D/A converters 76R, 76G and 76B perform computation of $V_{REF} \times /64$ (x: value converting each data of $R\text{-}REF_{0-5}$, $G\text{-}REF_{0-5}$ and $B\text{-}REF_{0-5}$ into decimal numerals) and output $R\text{-}V_{REF}$, $G\text{-}V_{REF}$ and $B\text{-}V_{REF}$ to A/D converters 71R, 71G and 71B respectively.

(c) Serial Output of CCD Sensor

An analog signal processing part 31 is constructed so as to receive the signal outputs $OS_1$–$OS_5$ of each CCD sensor chip 11-15 in parallel, and samplehold and be performed A/D conversion for each chip respectively, in order to read at high speed a tight-contact type sensor 4. Therefore, it is necessary to output image data in series of effective picture elements output of signal outputs $OS_{1-OS5}$ per one line from $OS_1$–$OS_5$. Hence, digital data $RB_{0-7}$, $GB_{0-7}$ and $BB_{0-7}$ (FIG. 12) of image digital data of the respective CCD sensor chips 11-15, which have been A/D converted and synchronized, are temporarily stored in the memory and read out in synchronism with clock CK-A in the order of CCD sensor chips 11-15.

Figure 15:
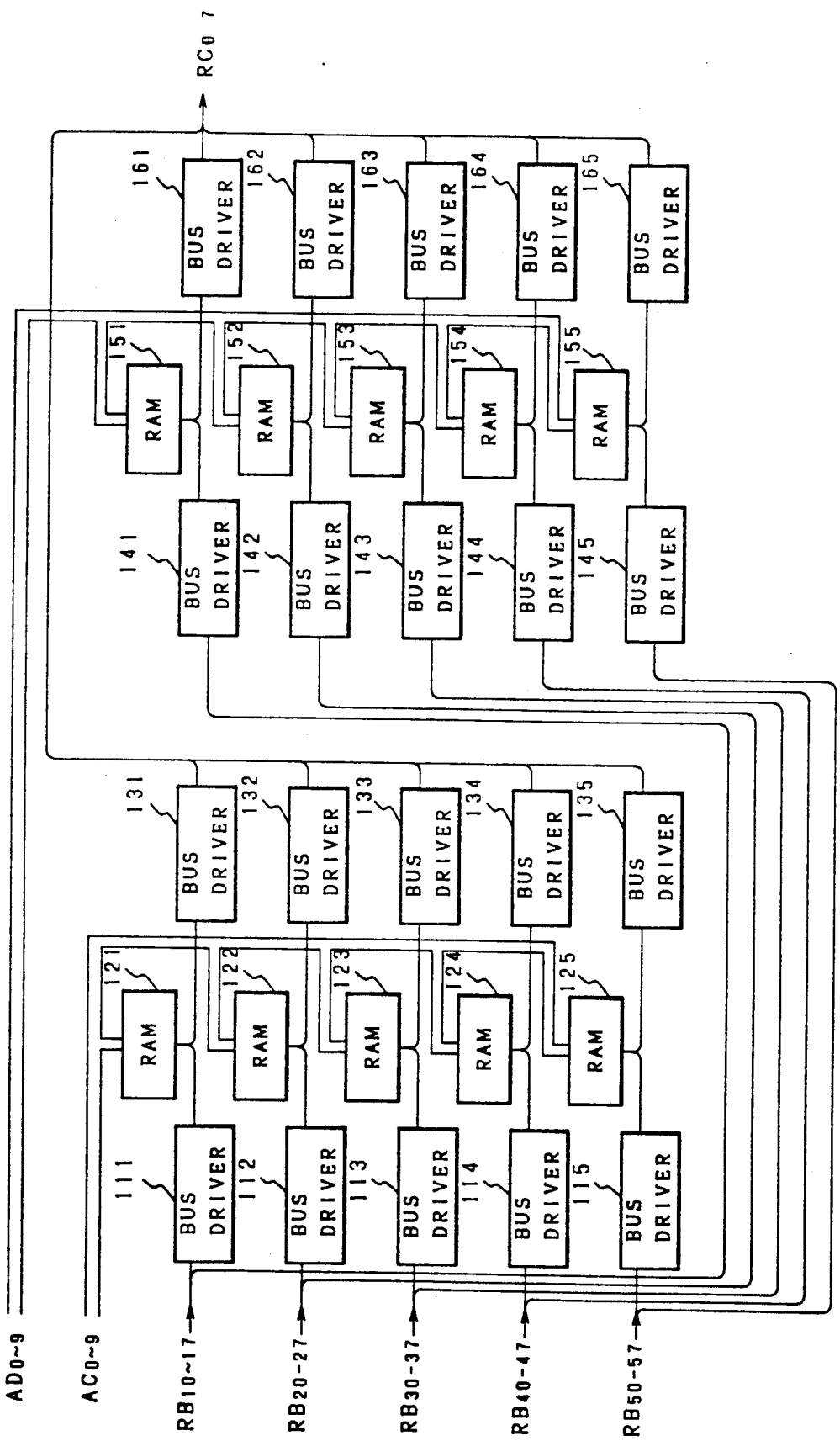
FIG. 15 is a diagram showing a circuit making parallel/serial conversion of a signal output of R of each CCD chip in the analog signal processing part.
Figure 16:
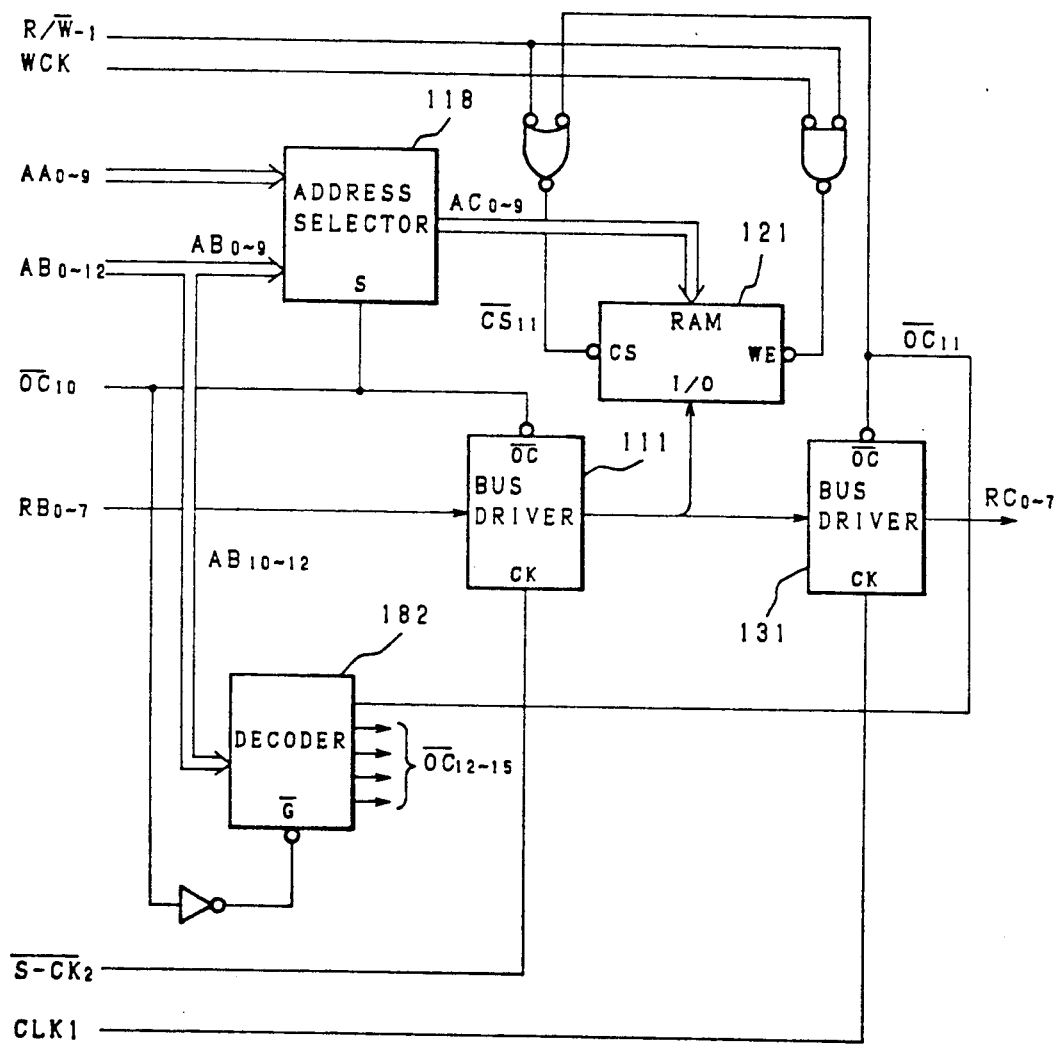
FIG. 16 is a circuit diagram showing parallel/serial conversion of a signal output in one CCD chip, FIGS. 17($a$) and 17($b$) are timing charts of parallel/serial conversion.
Figure 17A:
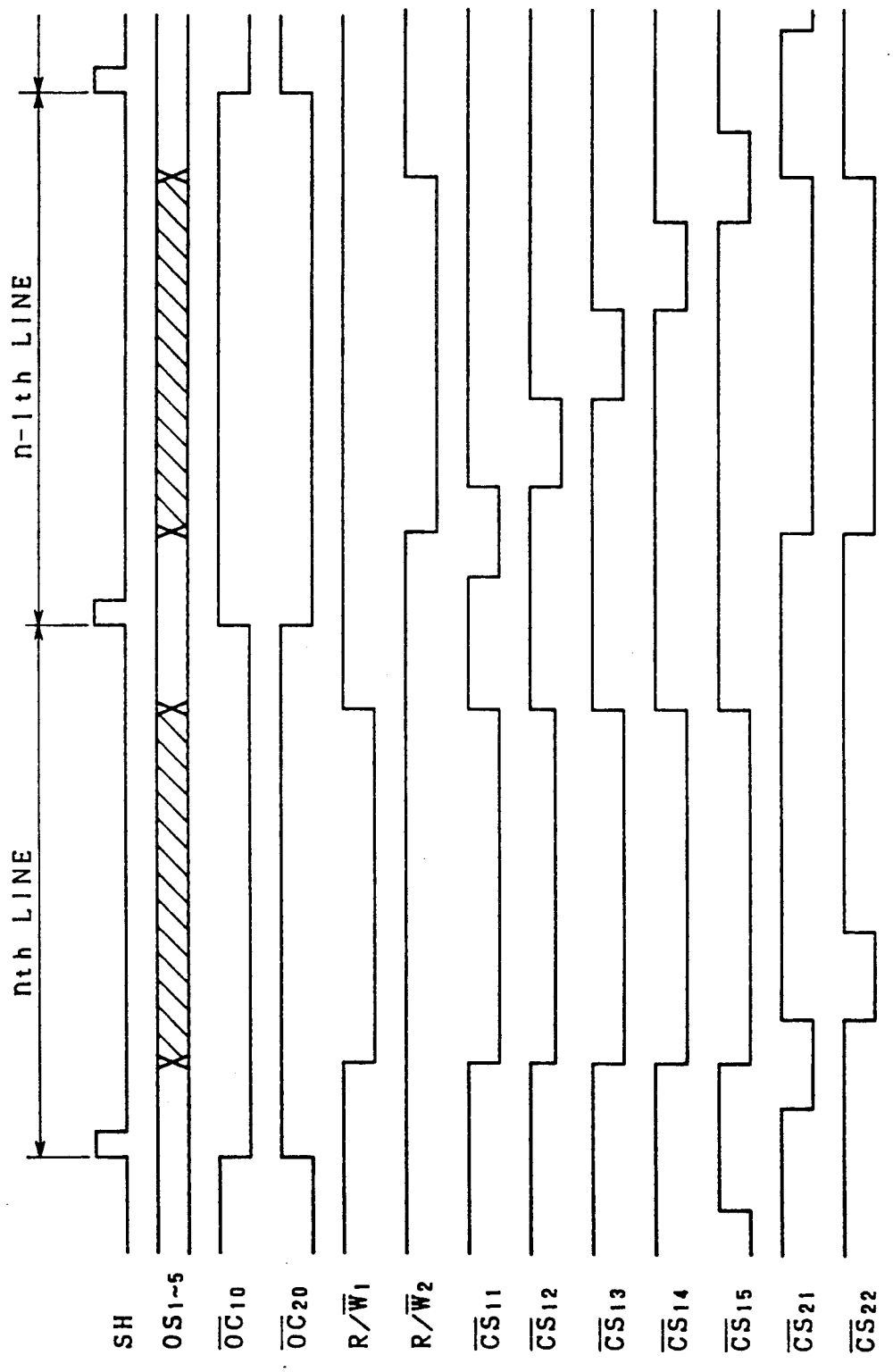

FIG. 15 shows a circuit for parallel/serial converting digital data $RB_{0-7}$ of R output signal of the respective CCD sensor chips 11-15 (to be called digital data $RB_{10-17}$, $RB_{20-27}$... corresponding to the respective CCD sensor chips 12-15). FIG. 16 shows in detail a circuit to parallel/serial convert the output signal of one chip. FIGS. 17(a) and 17(b) show the timing chart thereof.

As shown in FIG. 15, for example, digital data $RB_{10-17}$ of the output signal of CCD sensor chip 11 is written in addresses $AC_{0-9}$ and $AD_{0-9}$ of RAM 121 and 151 through bus drivers 111 and 141. Data of addresses $AC_{0-9}$ and $AD_{0-9}$ of RAM 121 and 151 are read through bus drivers 131 and 161. As discussed below, when one of a pair of RAMs 121 and 151 write data, the other reads data of the former line. Digital data $RB_{20-27}$, $RB_{30-37}$, $RB_{40-47}$ and $RB_{50-57}$ of output signal of other chips 12-15, are written in the same way in RAM 122-125 and 152-155 through bus drivers 112-115 and 142-145 and are also read out through bus drivers 132-135 and 162-165. Each memory has capacity of 1 kilo bytes capable of storing therein a signal to an extent of one CCD sensor chip color-decomposed in R, G and B.

As shown in FIGS. 17(a) and 17(b), when data is written in a pair of memories (for example, and 151), the bus drivers 111 and 141 alternately give to memories 121 and 151 the digital data $RB_{10-17}$ corresponding to that signal $\overline{OC10}$ and $\overline{OC20}$ input to an $\overline{OC}$ terminal are alternately given per one line. When the signals $\overline{OC10}$ and $\overline{OC20}$ are "L", the memories 121 and 151 can be written alternately per one line by signals R/W1 and R/W2 (CS="L"), digital data $RB_{10-17}$ of image data are stored in the addresses $AD_{0-9}$ and $AD_{0-9}$ of memories 121 and 151 corresponding to the timing of clock WCK. The addresses $AC_{0-9}$ and $AD_{0-9}$ are address $AA_{0-9}$ selected by address selectors 181 and 191 (not shown) when $\overline{OC10}$ and $\overline{OC20}$ are "L".

The memories 121 through 125, 151 and 155 are read to be a series of image data $RC_{0-7}$. For read-out, when signals $\overline{OC10}$ and $\overline{OC20}$ are "H", signals $\overline{OC11}$ through $\overline{OC15}$ and $\overline{OC21}$-$\overline{OC25}$ sequentially selecting the bus drivers 131-135 and 161-165 through decoders 182 and 192 (not shown) are delivered. Hence, the data stored in the addresses $AC_{0-9}$ and $AD_{0-9}$ of memories 121-125 and 151-155 is read at the timing of clock CLK1 and the serially converted image data $RC_{0-7}$ is outputted, the addresses $AC_{0-9}$ and $AD_{0-9}$ being address $AB_{0-9}$ selected by address selectors 181 and 191. The high order 3 bits of addresses $AB_{0-12}$ are used for serial selection of bus drivers 131-135 and 161-165 by the decoders 182 and 192.

Read data of G and B are similarly outputted to serial image data $GC_{0-7}$ and $BC_{0-7}$.

In addition, the signals $R/\overline{W1}$, $R/\overline{W2}$, $\overline{OC10}$-15, $\overline{OC20}$-25, clocks WCK, S/CK2 and CLK1, and addresses $AA_{0-9}$ and $AB_{0-12}$ are given by CPU40.

(d) Shading Correction

Figure 18:
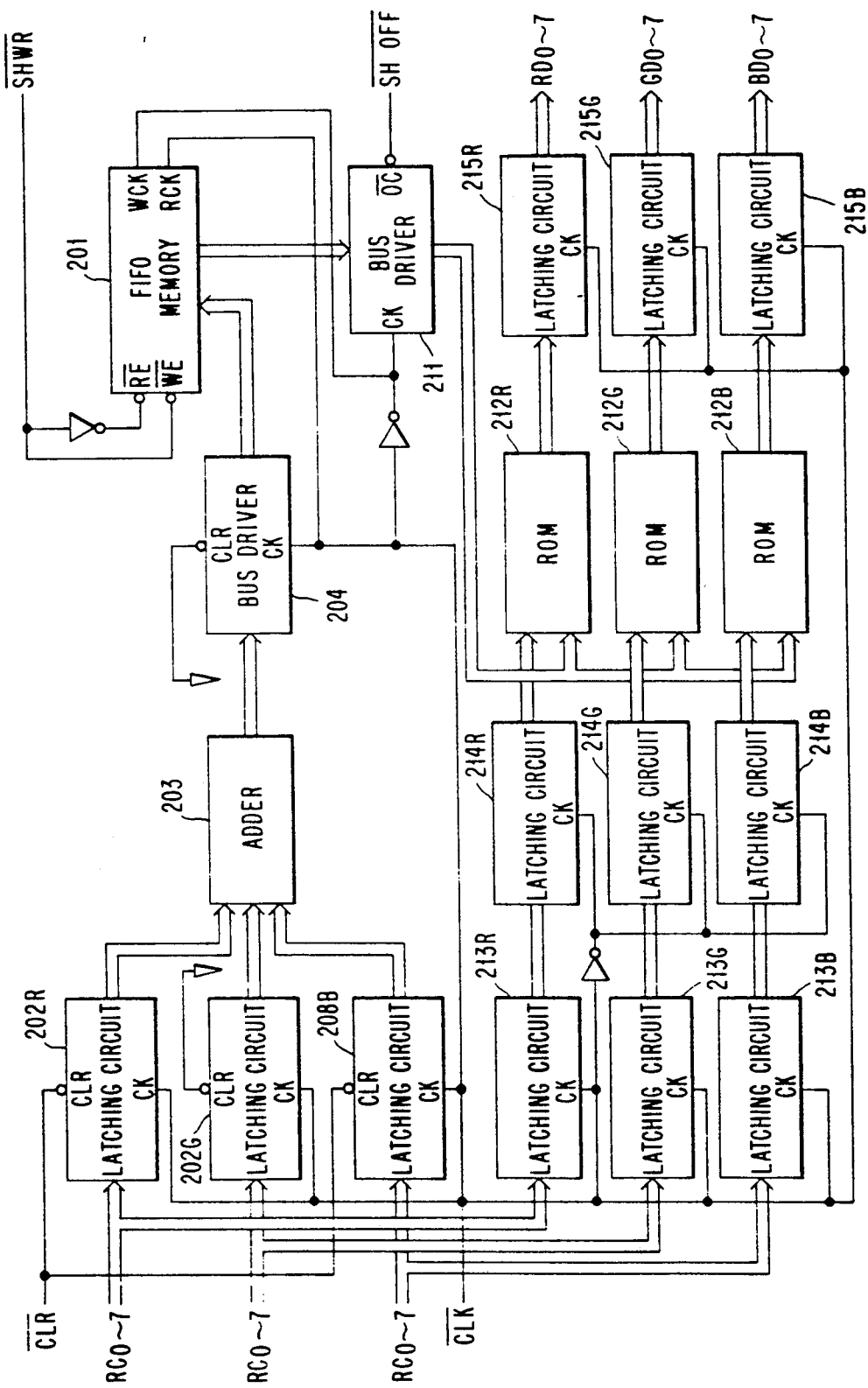
FIG. 18 is a block diagram showing a configuration of a shading correcting part.
Figure 19:
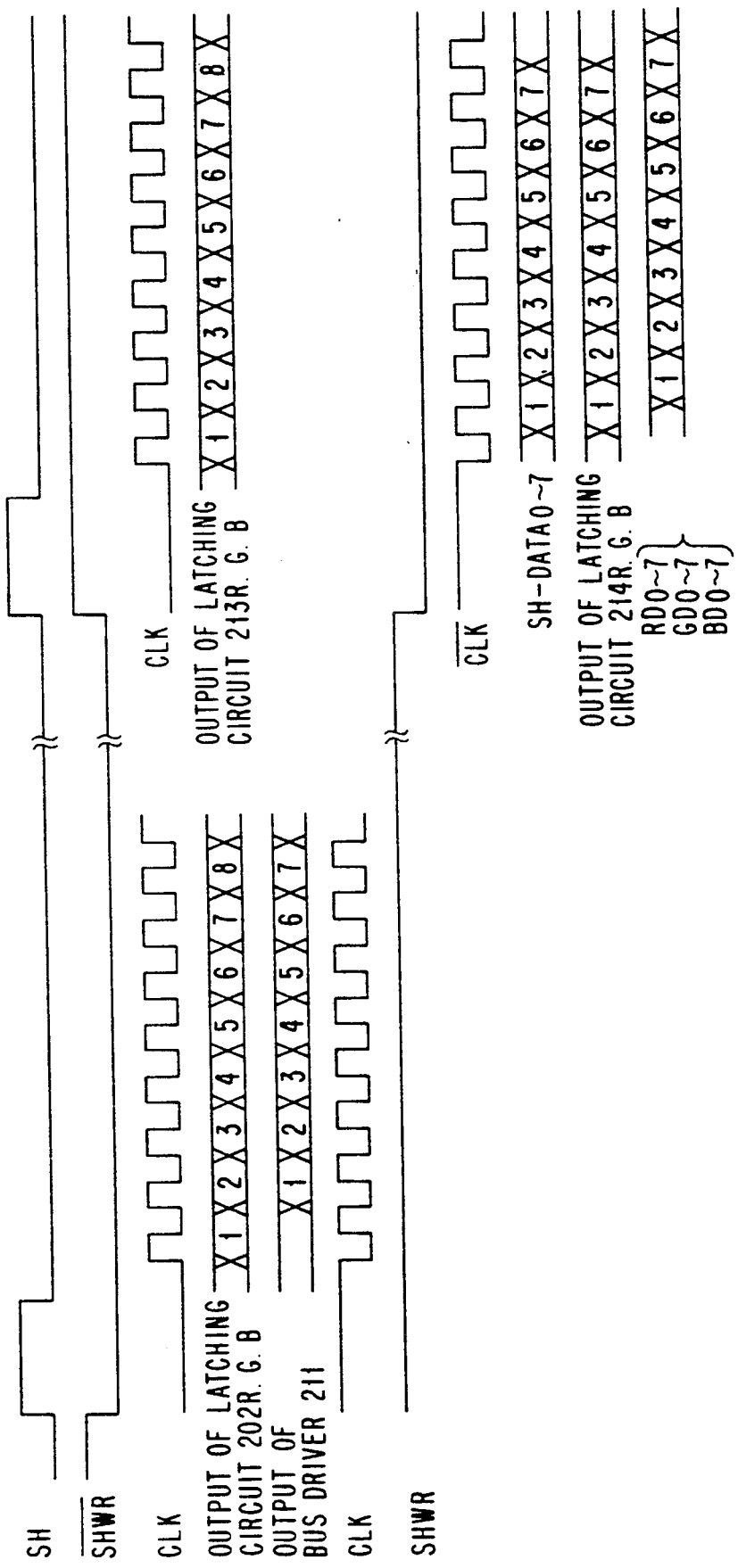
FIG. 19 is a timing chart of shading correction.

Next, shading correctin is carried out for eliminating shading distortion. FIG. 18 is a block diagram of a configuration of a shading correction part and FIG. 19 is a timing chart of shading correction.

The correction is carried out as follows: At first, and image read apparatus, prior to the start of scanning, reads reference white pattern 7 (refer to FIG. 1) having uniform white color density and stores data for one line thereof in RAM (FIFO memory) 201. For the reference values to be stored in RAM201, high order 6 bits of mean values of image data $RC_{0-7}$, $GC_{0-7}$ and $BC_{0-7}$ for one line are used. Therefore the image data $RC_{0-7}$, $GC_{0-7}$ and $BC_{0-7}$ are temporarily recorded in latch circuits 202R, 202G and 202B and added by an adder 203 to use the high order 6 bits, the mean values thereof being stored in RAM201 through a bus driver 204. The reason for using the mean value is that, when reference data is stored in RAM at every signal color-decomposed, the number of sample hold data becomes tripling so as to increase the RAM capacity.

Next, simultaneously to the scanning start, reference data (SH-DATA$_{0-5}$) in RAM201 is read at every one line (SHWR=1) and inputted to address terminals of R, G and B shading correction converters ROM212R, 212G and 212B through a bus driver 211. On the other hand, R, G and B image data RC$_{0-7}$, GC$_{0-7}$ are latched to latch circuits 213R, 213G and 213B respectively and then, in order to synchronize with the reference data (SH-DATA$_{0-5}$), the image data is latched to latch circuits 214R, 214G and 214B and thereafter inputted to the data terminals of converters ROM212R, 212G and 212B.

The table for shading correction is prestored in the converters ROM212R, 212G and 212B, the table gives the shadding-corrected values to be discussed below corresponding to the values of color-decomposed picture element data and reference data of said picture element.

Data outputs of conversion ROM212R, 212G, and 212B are latched to the latch circuits 215R, 215G and 215B by the clock CLK so as to be outputted as correction data RD$_{0-7}$, GD$_{0-7}$ and BD$_{0-7}$ respectively.

The shading correction circuit uses a FIFO (first-in-first-out) memory as the RAM201 storing the reference data, the FIFO memory is the dual port memory and requires no address input, thereby outputting the input-/output data in synchronism with RCK and WCK and also the data is read always in the order of write-in. The use of this memory requires no address and can omit counters generating addresses and an address selector for switching read and write addresses, thereby obtaining the merit with respect to the manufacturing cost and substrate area. Also, control is easy because, even when written-in, read-out is possible.

Figure 20:
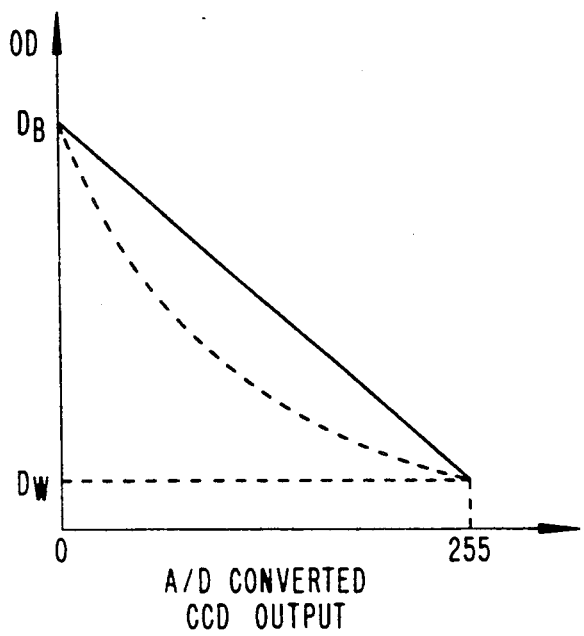
FIG. 20 is a graph showing shading correction data.

The correction data stored in the converters ROM212R, 212G and 212B have values described as follows:

FIG. 20 is a graph showing the shading correction, and the ordinate represents original image density and the abscissa represents the CCD output after A/D conversion. Generally, when the original (monochromic) is read, original image density OD of each data of R, G and B digitized by CCD output X has the following relation (see the broken line in FIG. 20)

$$OD = -\log \frac{(286 - X) 10^{-DB} + X 10^{-DW}}{256}$$

which is derived from the relation that the original image density OD and reflection factor R have therebeteween a relation of OD==logR, where $D_B$ is a reflection factor to block, $D_W$ to white, and X is the quantized (digitized) CCD output. However, where such corrected values are used to perform the binary-digitalizing conversion by the dither process, intervals between threshold values in a dither matrix cannot be linear, but become narrow as the density of area becomes low. Accordingly, the image quality at a high density area lowers. Hence, in the converter ROMs 212R, 212G and 212B, the data to be converted into the following relation:

$$OD = -\frac{D_B - D_W}{256} \cdot X$$

as shown by the solid line in FIG. 19, is stored as the correction data.

Therefore, the conversion to the correction data can simultaneously perform the so-called gamma correction other than the shading correction.

Accordingly, the dither process at an half-tone processing part 37 can perform the binary-digitalizing conversion with accuracy.

Also, when the binary signal outputs of R, G and B are converted to three colors of cyan, magenta and yellow, during the outputting, they need only be directly converted.

In addition, signals SHWR and CLK for conversion are given by CPU.

Next, explanation will be given on a second embodiment of the invention. The first embodiment carriers out the shading correction by use of the mean value of chrominance signals of R, G and B, but the second embodiment carries out the same for each color by one chrominance signal among R, G and B as the reference. Hence, the second embodiment is different from the first embodiment in the shading correction circuit.

The shading correction is performed as follows: At first, a color image read apparatus, prior to the start of scanning, reads the reference white pattern 7 (see FIG. 1) of uniform white density and stores in RAM (FIFO memory) 201 the data for one line. The reference value to be stored in RAM201 uses the high order 6 bits of image data GC$_{0-7}$ among the image data RC$_{0-7}$, GC$_{0-7}$ and BC$_{0-7}$ for one line. Therefore, the image data GC$_{0-7}$ are temporarily recorded at the latch circuit 202 respectively and then stored in RAM201 through the bus driver 204. The reason for using the values of image data GC$_{0-7}$ of green is that when the reference data is stored in RAM201 at every signal color-decomposed, the number of sample hold data becomes tripling so as to increase the RAM capacity. In addition, the reference data uses the image data GC$_{0-7}$, but alternatively, may use the image data RC$_{0-7}$ or that BC$_{0-7}$.

Thereafter, the correction data RD$_{0-7}$, GD$_{0-7}$ and BD$_{0-7}$ are outputted under the procedure the same as the first embodiment.

Next, explanation will be given on a third embodiment of the color image read apparatus of the invention. The two former embodiments use five CCD sensor chips having 3072 effective read picture elements for reading an original of A3-size by resolution 16 lines/mm, but the third embodiment and so on is deemed to read th original in A4-size by resolution of 16 lines/mm, the CCD sensor chip using 2592 effective read picture elements.

Figure 22:
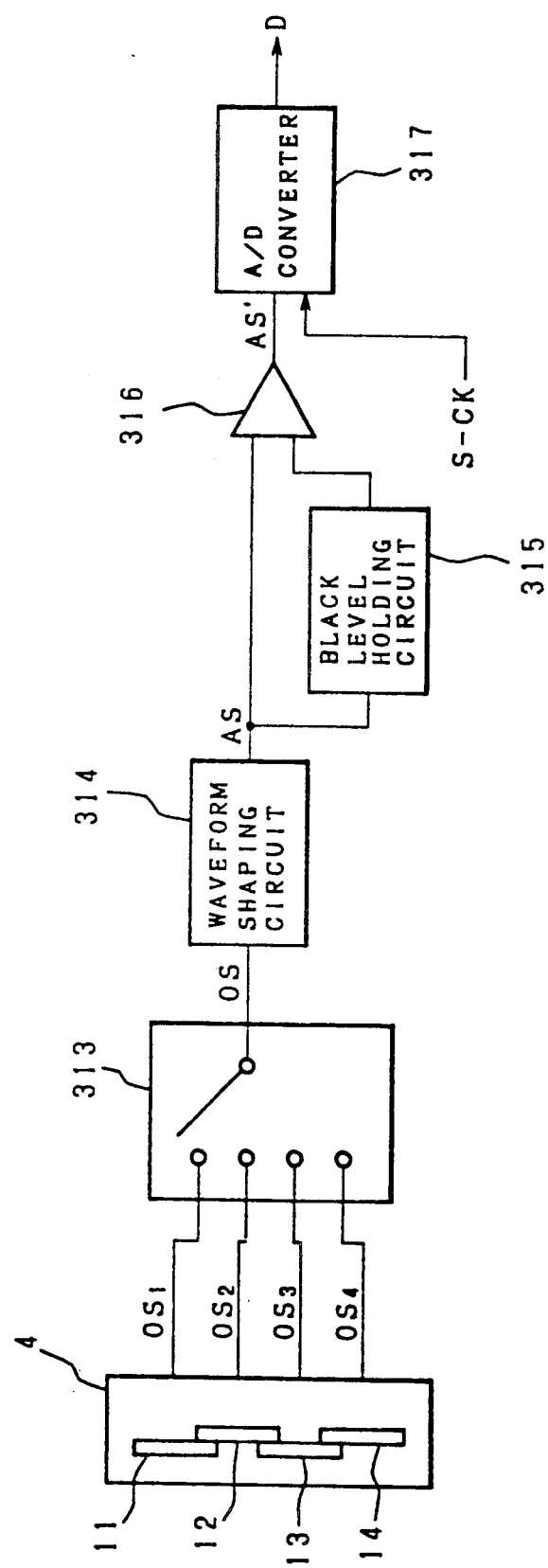
FIG. 22 is a block diagram showing a configuration of an analog signal processing part of a third embodiment of the color image read apparatus in accordance with the present invention.
Figure 23:
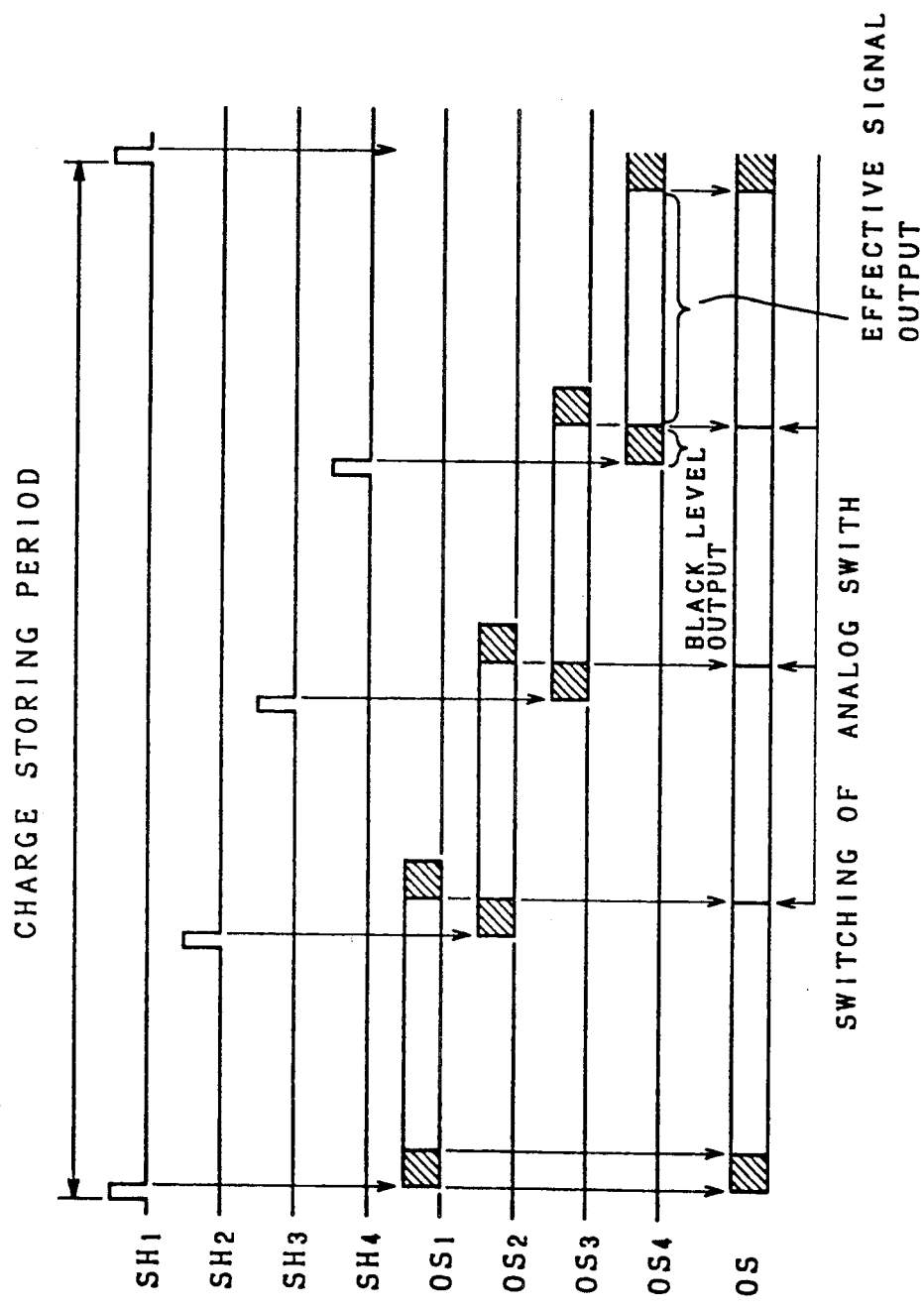
FIG. 23 is a timing chart showing drive timing of an image data output of a CCD sensor used for the third embodiment.

FIG. 22 is a block diagram showing the process of converting into a digital signal DS image data signal outputs OS$_1$, OS$_2$, OS$_3$ and OS$_4$ from the CCD sensor chips 11. 12 . . . . FIG. 23 shows the driving timing for the image data signal outputs OS$_1$, Os$_2$, OS$_3$ and OS$_4$ photoelectric-converted by the CCD sensor chips 11, 12 . . . . The signal outputs OS$_1$, OS$_2$, OS$_3$ and OS$_4$ are driven by pulses SH$_1$, SH$_2$, SH$_3$ and SH$_4$ respectively so as not to overlap the periods of effective signal outputs with each other. The CCD sensor chips 11, 12 . . . , when the pulses SH$_1$, SH$_2$, SH$_3$ and SH$_4$ are inputted thereto, output signal voltage (hatched portion) of black level and then signal output (white portion) as the effective signal.

Figure 24:
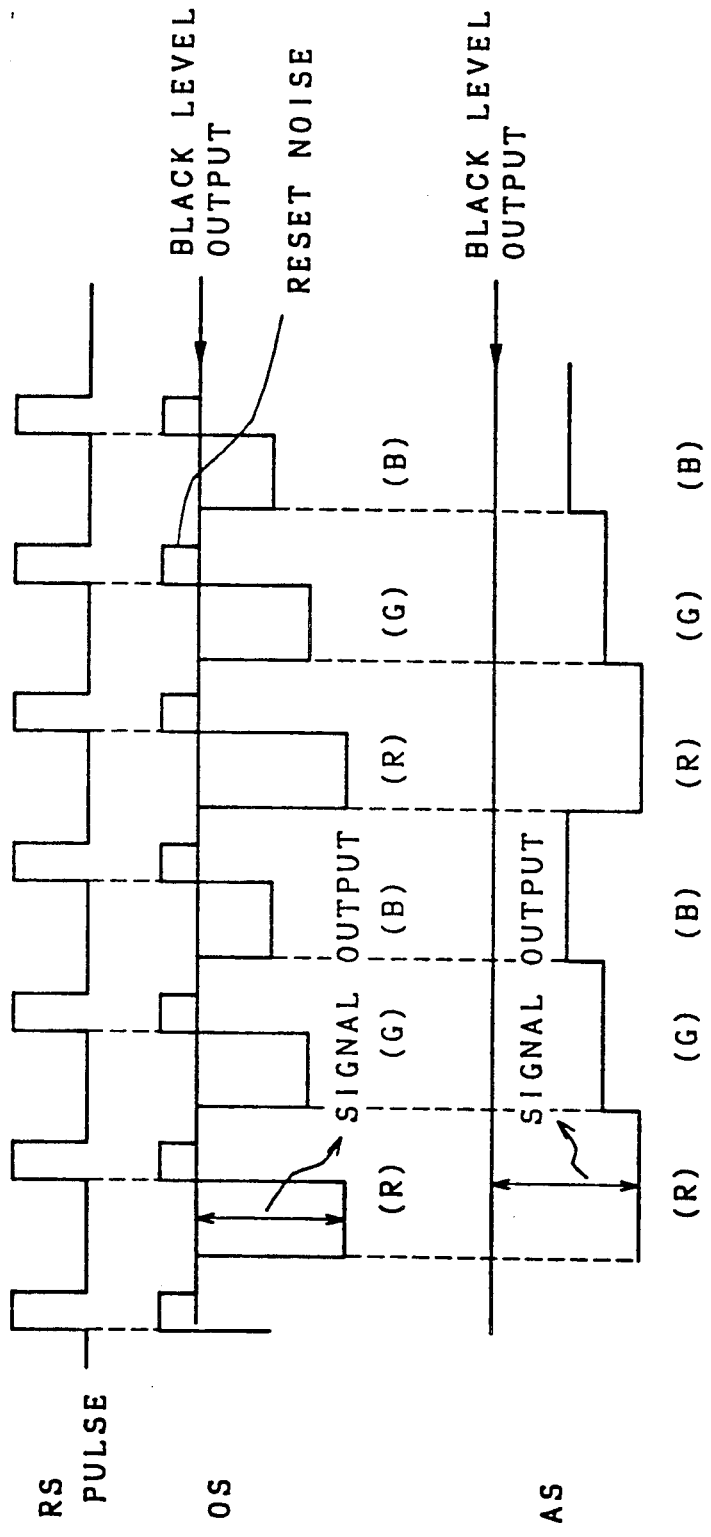
FIG. 24 is a waveform graph showing relationships between an input signal and an output signal of a waveform shaping circuit of the third embodiment shown in FIG. 6.

The signal outputs $OS_1$, $OS_2$, $OS_3$ and $OS_4$ are switched by an analog switch 313 at the timing shown in FIG. 23 so as to be a signal output of one line. FIG. 24 is a waveform chart showing the relation between an input signal and an output signal of a waveform shaping circuit. The outputs $OS_1$, $OS_2$, $OS_3$ and $OS_4$ are issued in synchronism with the pulse RS shown in FIG. 3, the output signal OS having the waveform as shown in FIG. 24, that is, the output signal OS being in serial row of the analog signal outputs of R, G and B, the signal outputs including reset noises respectively. The waveform shaping circuit 314 shown in FIG. 22 functions to eliminate the above reset noises so as to output an output signal AS of waveform as shown in FIG. 24. The output signal AS has offset voltage of about 6 V and outputs the signal in the negative direction corresponding to intensity of the light. FIG. 25 is a timing chart showing the relation between the analog signal and the digital signal. A saturation output of CCD sensor 4, as shown in FIG. 25, is about 1 V for the respective R, G and B signals. Therefore, differential amplification between the output signal AS and the black level output held in a black level hold circuit 315 is performed and converted into the output AS' (refer to FIG. 25), where the signal amplification is carried out at about 2.5 V or less in consideration of a dynamic range of A/D converter 317.

FIG. 25 shows the state where the signal AS' is converted by the clock S-CK into a digital signal DS through an A/D converter 317. The A/D converter 317 samples the input data at "H" of clock S-CK and holds it at "L", thereby converting the same into a digital signal DS of 8 bits.

Figure 26:
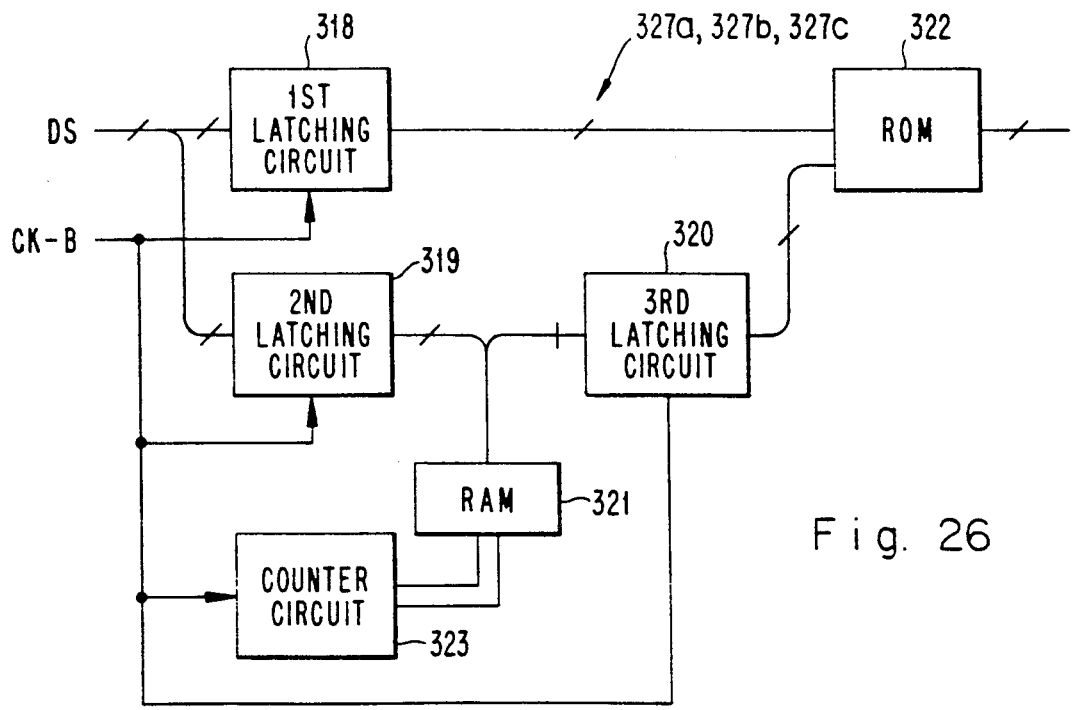
FIG. 26 is a block diagram showing configuration of a shading correction part of the third embodiment.
Figure 21:
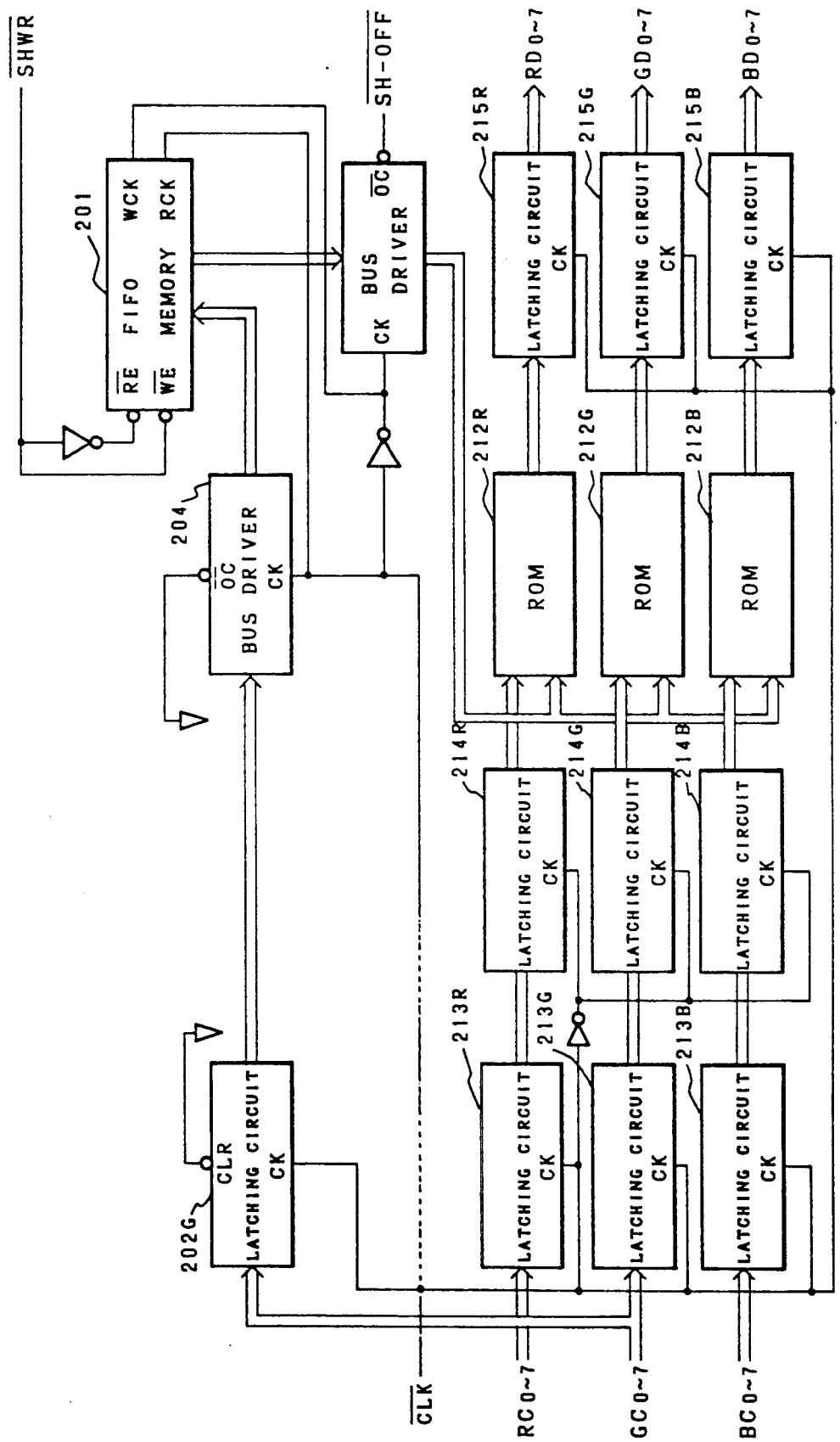

FIG. 26 is a block diagram of the shading correction part. The following method is often used for shading correction.

At first, an optical system of an image read apparatus is allowed to scan a reference white pattern 7 having a certain reference density, the signal data obtained by the above wasy is stored in RAM as the shading data. When an original is scanned, the shading data in the RAM is read in synchronism with the image signal obtained by the scannig at every line, so that ROM pre-storing therein the table for shading correction is table-looped-up by using the shading data and image signal data as address, thereby performing data correction. Next, explanation will be given on FIG. 26.

Clock CK-B is the clock having a dot cycle period in synchronism with the digital image signal DS. When the reference white pattern 7 is scanned, a second latch circuit 319 operates, the counter circuit 323 generates address by the clock CK-B, and the shading data latched by the second latch circuit 319 is stored in RAM321 which has capacity storable of 8-bit data for one line of main scanning. When the original is scanned, it is switched to the reading mode and the second latch circuit 319 does not operated, the signal DS being inputted as address to ROM322 through a first latch circuit 318. On the other hand, the shading data read out from the RAM321 is inputted into ROM322 through a third latch circuit 320 in order to synchronize with the signal DS. The ROM322 prestores therein the table having the shading correction data so as to carry out looking-up by using the signal DS and shading data as address, thereby outputting image data to an electric magnifying part 35 at the next stage.

In a case that the color original is read, however, the aforesaid method for shading correction has the defect that, when the color balance correction is simultaneously carried out, reliability of the corrected signal lowers as above-mentioned, or the table capacity of ROM322 at the shading correcting part 32 becomes larger.

Hence, in the third embodiment of the color image read apparatus, similarly to the first and second embodiments, the color balance correction is also carried out by setting the reference voltage for A/D conversion independently of each color of R, G or B.

In order to independently set the reference voltage at R, G or B by use of one A/D converter, it is necessary to use clock so as to control switching of R, G and B with respect to the A/D converter. However, in fact there is a problem in the response speed of the A/D converter, whereby it is difficult to respond at high speed. Therefore, it is preferable to use two or more or preferably three A/D converters in order to independently convert the response to be carrier out at high speed. In this embodiment, the A/D converter is used for each color of R, G or B. The reference voltage of A/D converter is set so that, when the reference white pattern 7 of uniform density is read by the color image read apparatus, the respective A/D converters issue the same outputs of signal photoelectrically converted by the image sensor as to each R, G or B.

The problem of short capacity of ROM will be solved by setting the shading correction circuits every at one block in parallel with respect to each output signal of R, G or B.

Figure 27:
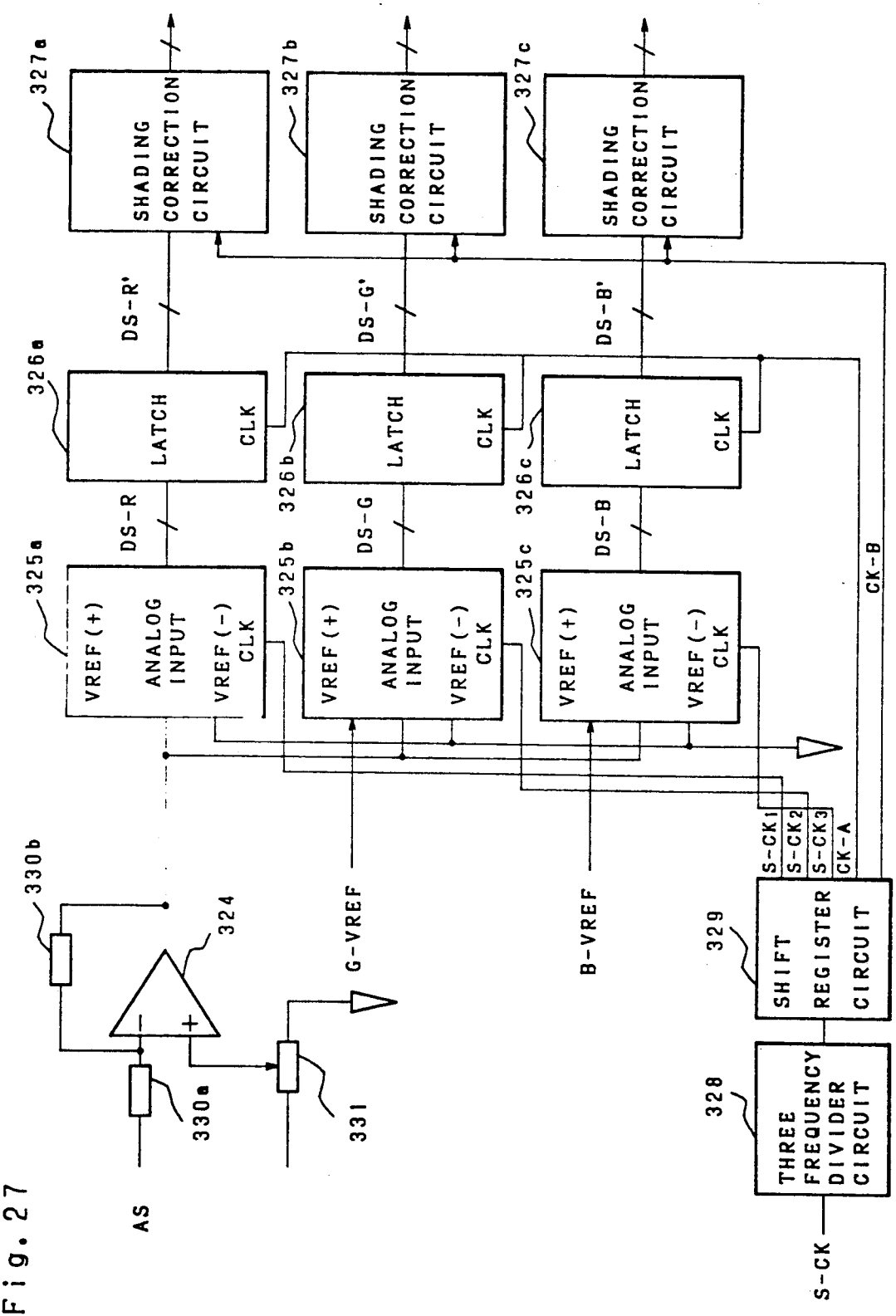
FIG. 27 is a block diagram showing a relationship between and A/D converting part and the shading correcting part of the third embodiment.
Figure 28:
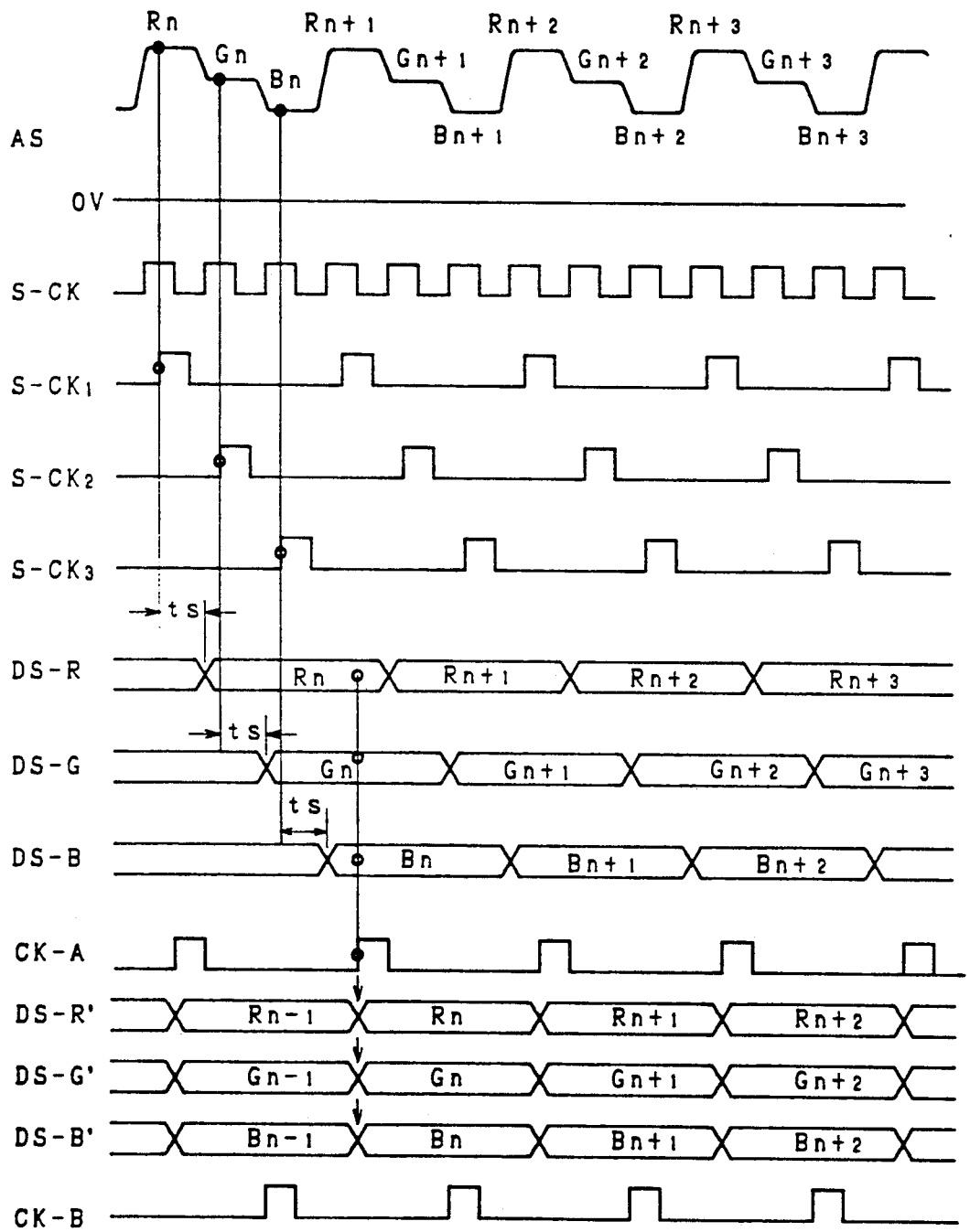
FIG. 28 is a timing chart of the A/D converting part of the third embodiment.

FIG. 27 is a block diagram of a part of an analog signal processing part and a shading correcting part, which will be described as follows:

FIG. 28 is a timing chart of this circuit.

The third embodiment, as shown in FIG. 27, is composed mainly of A/D converters 325a, 325b and 325c of three stages provided corresponding to R, G and B, and those A/D converters are connected one to one to shading correcting circuits 327a, 327b and 327c through latch circuits 326a, 326b and 326c respectively.

The waveform-shaped analog image signal AS (refer to FIGS. 22 and 25) is differentially amplified by the amplification factor depending on the black level output adjusted by variable resistance 331 and a ratio of resistance 330a to 330b by an operational amplifier 324 and inputted to the A/D converter 325a, 325b and 325c corresponding to the respective three colors of R, G and B. The converters 325a through 325c divide in three by a three frequency divider 328 the clock S-CK of cycle period coincident with the image signal frequency and thereafter convert the analog image signals of R, G and B into digital signals DS-R, DS-G and DS-B in accordance with clocks $S-CK_1$, $S-CK_2$ and $S-CK_3$ shifted and generated by a shift register circuit 329. The rising edge of clocks $S-CK_1$, $S-CK_2$ and $S-CK_3$ are coincident with the stable period of analog signal of R, G and B respectively. The A/D converters 325a through 325c delay by TS(a setting time) from the rising edge of input CLK and defines data (refer to FIG. 11). The respective digital signals DS-R, DS-G and DS-B of R, G and B synchronize with each other by the clock CK-A at the latch circuits 326a, 326b and 326c. The signals DS-R, DS-G and DS-B are corrected by the shading correction circuits 327a, 327b and 327c as same as shown in FIG. 26, and the counter circuit 323 in FIG. 26 is used in common together with the respective shading correction circuits 327a, 327b and 327c.

The A/D converters 325a to 325c convert analog input values of $V_{REF}(-)$ to $V_{REF}(+)$ into digital signals of 8-bits. The analog image signal AS' is 0V when the original is black, whereby the lower limit $(V_{REF}(-))$ of reference voltage of the respective A/D converters 325a to 325c is fixed to GND, the upper limits $(V_{REF}(+))$ being independently settable respectively, the $V_{REF}(+)$ performing color balance correction.

Figure 29:
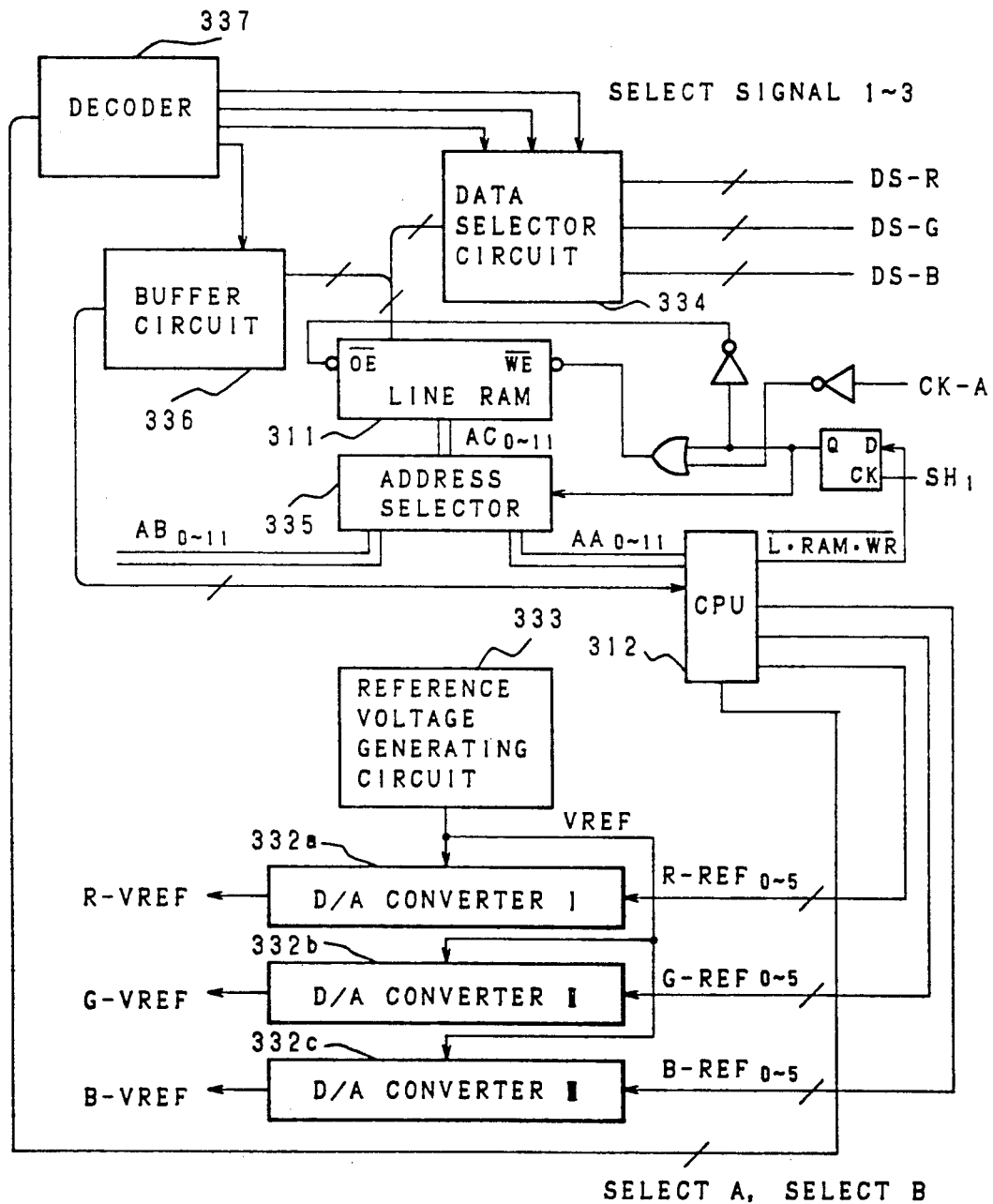
FIG. 29 is a block diagram showing a configuration of a circuit setting a reference voltage of the third embodiment.

FIG. 29 is a block diagram of circuit for setting reference voltage. CPU312 reads and writes for one line by L·RAM·WR signal, Select A and Select B signals by the image data of R, G and B obtained at a line RAM311 by the reference white pattern 7. For example, in a case of R, the reference white pattern data is temporarily stored for one line in RAM311 and then read out so as to detect the maximum value x in the data and carry out the following internal computation to obtain 6-bit numeral values $R\text{-}REF_{0\text{-}5}$ as the reference voltage and output it to the corresponding A/D converter 332a. A reference voltage generating circuit 333 normally outputs constant reference voltage $V_{REF}$ to the D/A converters 332a to 332c. Essentially, the maximum value x of data R corresponding to the reference white pattern 7 must coincide with the maximum value 64 corresponding to the reference voltage $V_{REF}$, but normally does not coincide as above-mentioned.

Therefore, the reference voltage $R\text{-}V_{REF}$ for R is obtained by computation of $V_{REF} \times x/64$ and reference voltage $R\text{-}V_{REF}$ obtained by the computation is outputted to the $V_{REF}(+)$ terminal at the A/D converter 325a for R. Namely, the color image read apparatus radiates a pattern of uniform density just before scanning to thereby carry out the photoelectric conversion, and at that time CPU312 sets reference voltage R, G, $B\text{-}REF_{0\text{-}5}$ to "3FH" (=63). In other words, $V_{REF}(+)$ of the respective A/D converters 325a to 325c is the output $V_{REF}$ of the reference voltage generating circuit 333. In order to store the R data for one line in the memory, L·RAM·WR="L", Select A="L" and Select B="L" are deemed, and at that time the data selector circuit 334 selects the output DS-R by the output signal of decoder, the address selector 335 selects an address $AB_{0\text{-}11}$. The address $AB_{0\text{-}11}$ is address generated by the counter circuit 323 at the shading correcting circuit and synchronizes with DS-R.

Thus, the line RAM 311 stores the output DS-R for one line. Assuming that L·RAM·WR="H", Select A="H" and Select B="H", the data is read from the line RAM311, and at that time an address selector 335 selects address $AA_{0\text{-}11}$ outputted from CPU312. The read data is stored in CPU312 through a buffer circuit 336. The CPU312 decides a digital value $R\text{-}REF_{0\text{-}5}$ of reference voltage on the basis of the data of the highest value for one line. The reference voltage $R\text{-}V_{REF}$ is defined by D/A converter 332a and DS-R of proper value is outputted by the A/D converter 325a. Sequentially, also as to G and B, the CPU312 in the same way decides digital values $G\text{-}REF_{0\text{-}5}$ and $B\text{-}REF_{0\text{-}5}$ of reference voltage and feeds-back them to the A/D converters 325b and 325c.

Thus, the outputs DS-R, DS-G and DS-B are subjected to color balance correction by the reference voltages $R\text{-}V_{REF}$, $G\text{-}V_{REF}$ and $B\text{-}V_{REF}$ respectively.

Figure 30:
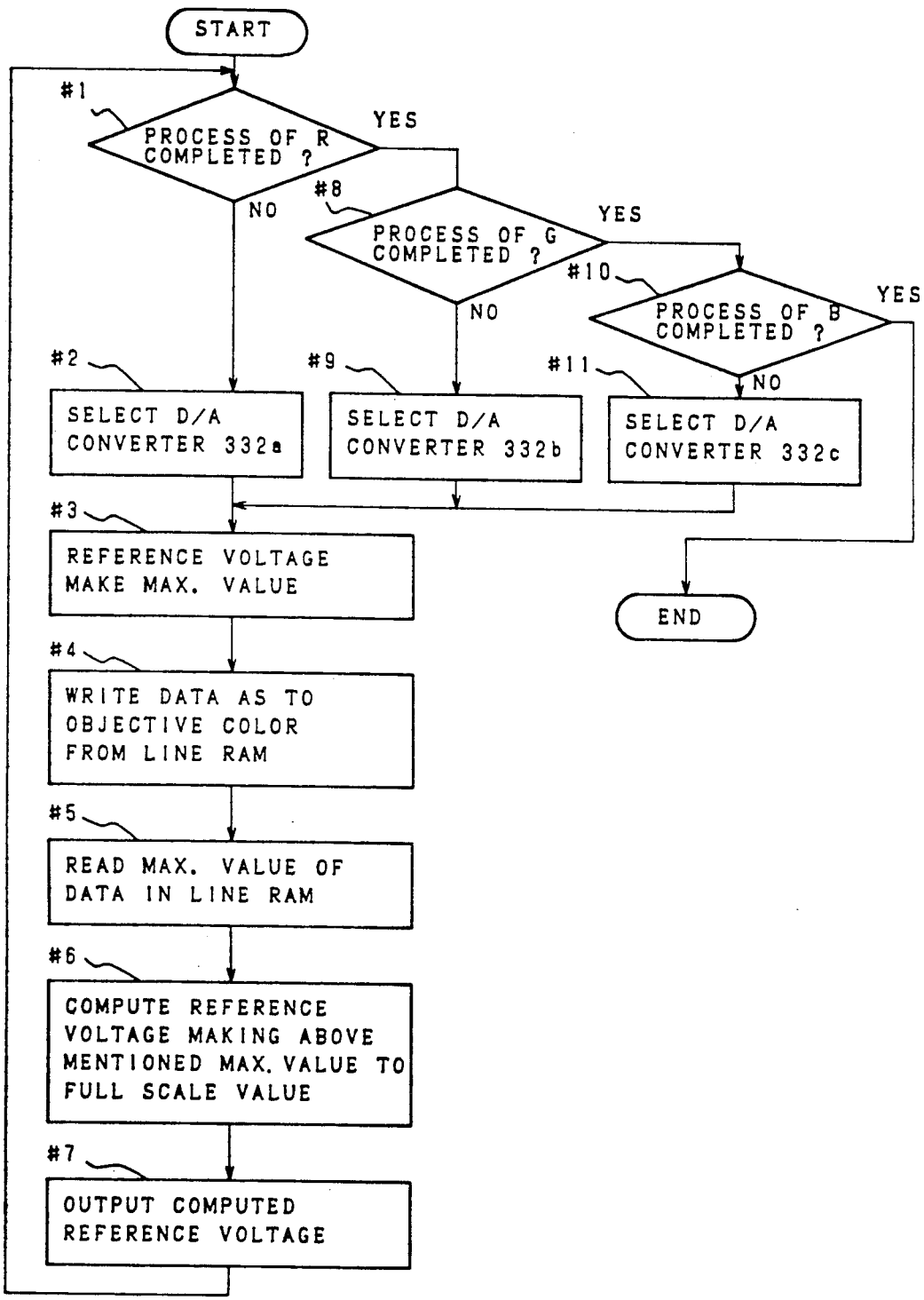
FIG. 30 is a flowchart for setting a reference voltage of the third embodiment.

The FIG. 30 is a flow chart of deciding the reference voltage $R\text{-}V_{REF}$, $G\text{-}V_{REF}$ and $B\text{-}V_{REF}$ by the CPU312.

At the step #1, if R is not get processed (NO), at the step #2 the D/A converter 332a is selected, and then at the step #3 the reference voltage $R\text{-}V_{REF}$ is made maximum value. Next, at the step 4, data as to the objective color R is written in line RAM311. At the step #5, the maximum value in the line RAM311 is read. At step #6, the reference voltage $R\text{-}V_{REF}$ whose the maximum value read out at the step 5 is full-scale is computed, and then, at the step #7, the reference voltage $R\text{-}V_{REF}$ is outputted so that the procedure returns to the step #1.

At the step #1, if process of R is finished (YES), the procedure is transferred to the step #8. At the step 8 if process of G is not finished (NO), at the step #9 the D/A converter 332b is selected and the procedure is transferred to the step #3.

Similarly, if process of G is finished at the step #8 (YES), the procedure is transferred to the step #10. At the step 10 if process of B is not finished (NO), at the step #11 the D/A converter 332c is selected and then the procedure is transferred to the step #3 and so on.

If process of B is finished at the step #10 (YES), the processes are entirely finished as to R, G and B, whereby setting of reference voltage ends.

In the above third embodiment, the content of line RAM311 is read out to automatically set reference voltage $R\text{-}V_{REF}$, $G\text{-}V_{REF}$ and $B\text{-}V_{REF}$ of A/D converters 325a to 325c of colors of R, G and B, but other means may be used which desirably obtain a different value of each signal of R, G and B.

Next, explanation will be given on a fourth embodiment of the color image read apparatus of the invention, in which G and R correct the color balance by use of common reference voltage.

Figure 31:
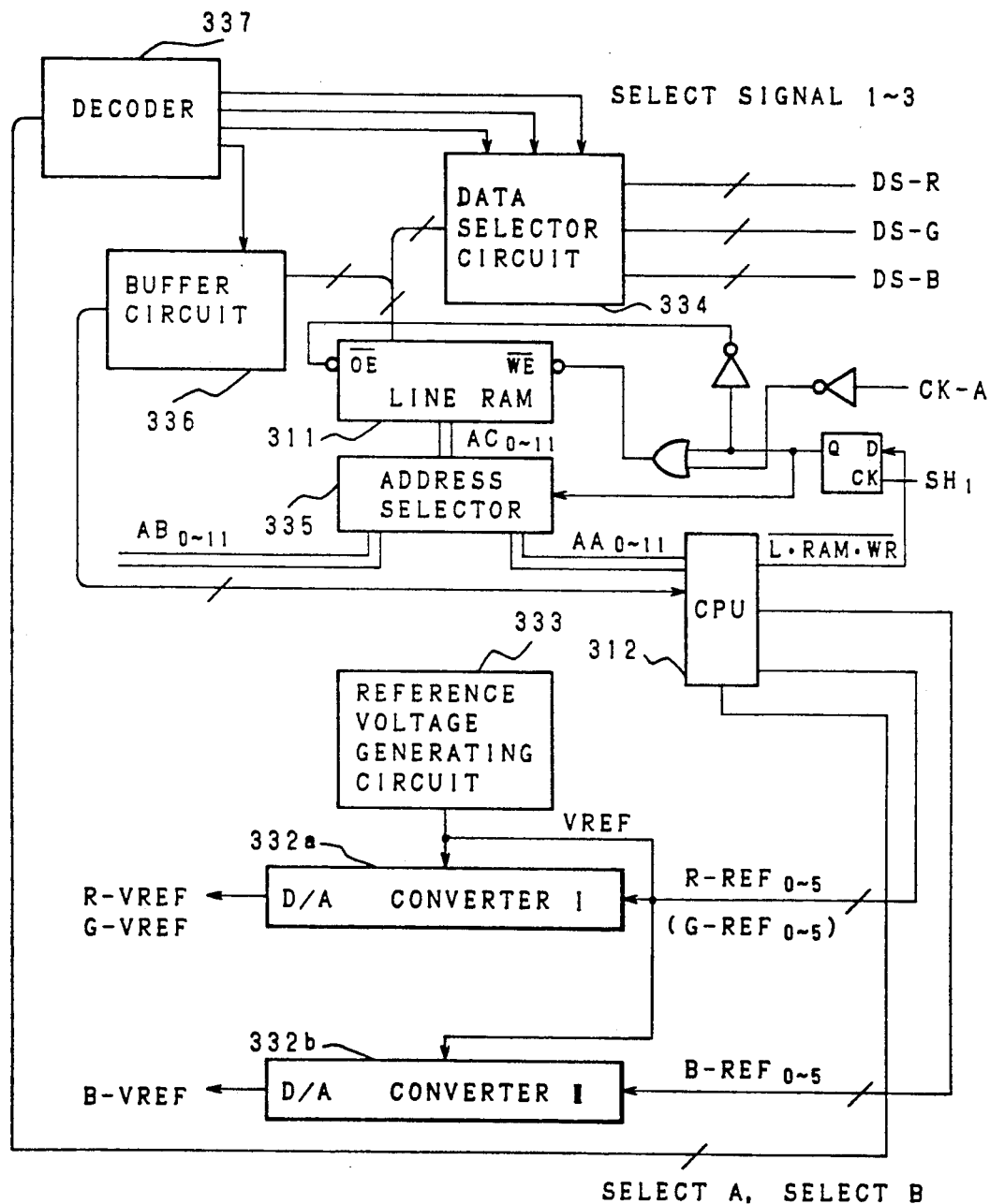
FIG. 31 is a block diagram showing a configuration of a circuit setting a reference voltage of a fourth embodiment of the color image read apparatus in accordance with the present invention.

FIG. 31 is a block diagram of a circuit for setting reference voltage at the fourth embodiment. As shown in FIG. 31, the main structure of this embodiment is that the digital signal DS-R, DS-G and DS-B are inputted to RAM311 through the data selector circuit 334 and the data selector circuit 334 is connected to CPU312 through decoder 337. Then line RAM311 is connected to CPU312 through address selector 335. CPU312 is connected to line RAM311 through buffer circuit 336. CPU312 is connected to the address selector 335 through flip-flop so as to synchronize with clock $SH_1$ and then is connected to the line RAM311 in synchronism with CK-A. Moreover, CPU312 is connected to the D/A converters 332a and 332b and the reference voltage generating circuit 333 is connected to the D/A converters 332a and 332b.

The explanation for the function of FIG. 31 is as follows:

CPU 312 reads and writes image data of R, G and B obtained by a reference white pattern 7 for one line in the line RAM11 by L·RAM·WR signal and select A and select B signals.

For example, for R(or G), the reference white pattern data is temporarily stored for one line in RAM311 and is read to detect the maximum value X in the data, the analog signal processing part 31 carries out the following internal computation, and 6-bit numeral values $R\text{-}REF_{0\text{-}5}$ ($G\text{-}REF_{0\text{-}5}$) are obtained as reference voltage, which is outputted to the corresponding D/A converter 332a. Constant reference voltage $V_{REF}$ is normally input from a reference voltage generating circuit 333 to the D/A converters 332a and 332b. Essentially, the maximum value x of data R(or G) corresponding to the reference white pattern 7 must coincide with a maximum value 64 corresponding to the reference voltage $V_{REF}$, but normally does not coincide. Therefore, the reference voltage $R\text{-}V_{REF}(=G\text{-}C_{REF})$ for R(or G) is obtained by computing $V_{REF} \times x/64$ and then the reference voltage $R\text{-}V_{REF}(=G\text{-}V_{REF})$ is outputted to the $V_{REF}(+)$ terminal at A/D converter 325a for R(G). In other words, the color image read apparatus, just before the scanning, radiates reference white pattern 7 of uniform density to perform photoelectric conversion, and at that time CPU312 was set the reference voltages $R\text{-}REF_{0-5}(G\text{-}REF_{0-5})$ and $B\text{-}REF_{0-5}$ to "3FH"($=63$), in other words, $V_{REF}(+)$ of the respective A/D converters 325a to 325c becomes the output $V_{REF}$ of reference voltage generating circuit 333. CPU312 obtains $\overline{L\text{-}RAM\text{-}WR}=\text{"L"}$, Select $A=\text{"L"}$ and Select $B=\text{"L"}$ in order to store in the memory R data for one line, and at that time a data selector 334 selects output DS-R(DS-G) by the output signal of decoder and an address selector 335 selects address $AB_{0-11}$. The address $AB_{0-11}$ is address generated by the counter circuit 323 at the shading correction circuit shown in FIG. 26 and in synchronism with the output DS-R(DS-G). Thus, the line RAM311 stores the output DS-R(DS-G) for one line. When $L\text{-}RAM\text{-}WR=\text{"H"}$, Select $A=\text{"H"}$ and Select $B=\text{"H"}$ are assumed, the data is read from the line RAM311, and at that time the address selector 335 selects address $AA_{0-11}$ outputted from CPU312. The read data is stored in CPU312 through the buffer circuit 336. CPU312 decides reference voltages $R\text{-}REF_{0-5}$ ($G\text{-}REF_{0-5}$) from data of the highest value for one line. Thus, the reference voltage $R\text{-}V_{REF}(G\text{-}V_{REF})$ is defined by D/A converter 332a and the A/D converter 325a(325b) outputs a proper value DS-R(DS-G). As to B, CPU312 in the same way decides reference voltages $B\text{-}REF_{0-5}$ and feeds-back it to the A/D converter 325c.

Thus, the outputs DS-R, DS-G and DS-B are carried out color balance correction by values of reference voltages $R\text{-}V_{REF}(=G\text{-}V_{REF})$ and $B\text{-}V_{REF}$.

Figure 32:
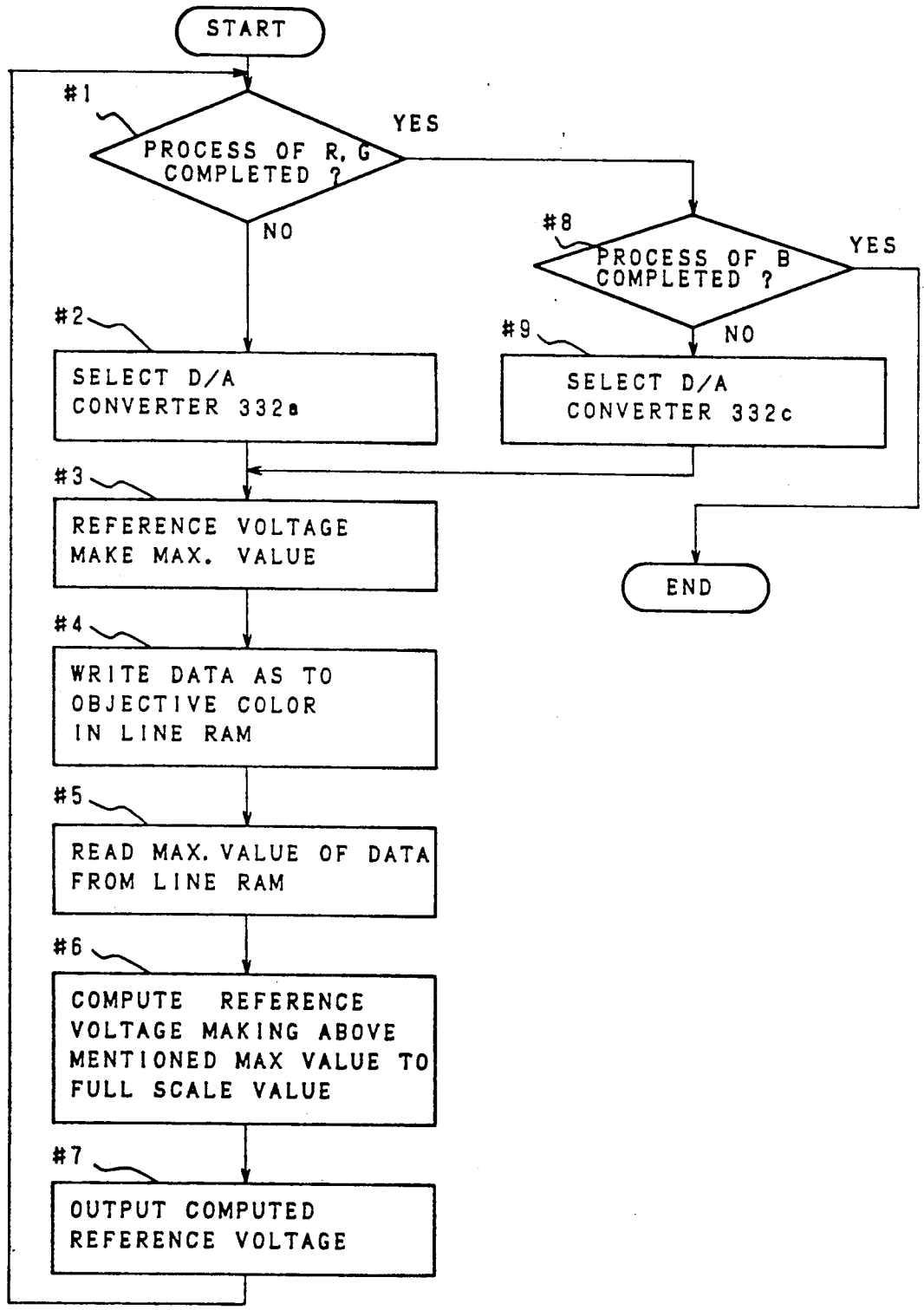
FIG. 32 is a flowchart for setting a reference voltage of the fourth embodiment.

FIG. 32 is a flow chart in that CPU312 decides reference voltages $R\text{-}V_{REF}$ and $B\text{-}V_{REF}$. At the step #1, if process for R and G is not finished (NO), at the step #2 the D/A converter 332a is selected. Then, at the step #3 a value of reference voltage $R\text{-}V_{REF}$ is made maximum. Next, at the step #4 the reference white pattern 7 of uniform density is read and data as to the objective color R is written in line RAM311. At the step #5 the maximum value in the line RAM311 is read. At the step #6 the reference voltage $R\text{-}V_{REF}$ ($=G\text{-}V_{REF}$) whose maximum value read at the step #5 is full-scale is computed. Then, at the step #7, the reference voltage $R\text{-}V_{REF}(=G\text{-}V_{REF})$ is outputted and the procedure returns to the step #1.

At the step #1, if processes of R and G are not finished (NO), at the step #9 the D/A converter 332b is selected and thereby the procedure is transferred to the step #3 and so on.

If process of B is finished at the step #8(YES), the procedure is finished, the process are entirely finished as to R, G and B, whereby setting of reference voltage.

Also, the A/D converter 325a and 325b are replaced by one A/D converter and the sampling clock thereof is the clock of taking OR of $S\text{-}CK_1$ and $S\text{-}CK_2$, in other words, clock of the timing which enables sampling of B signal and G signal, may be inputted, and at that time a $V_{REF}$ value setting time of CPU is reduced and the A/D converters need only be less in number.

Next, a fifth embodiment of the color image read apparatus of the invention will be described.

The fifth embodiment during the A/D conversion changes an amplification factor of the amplifier at the former stage, thereby correcting the color balance.

Figure 33:
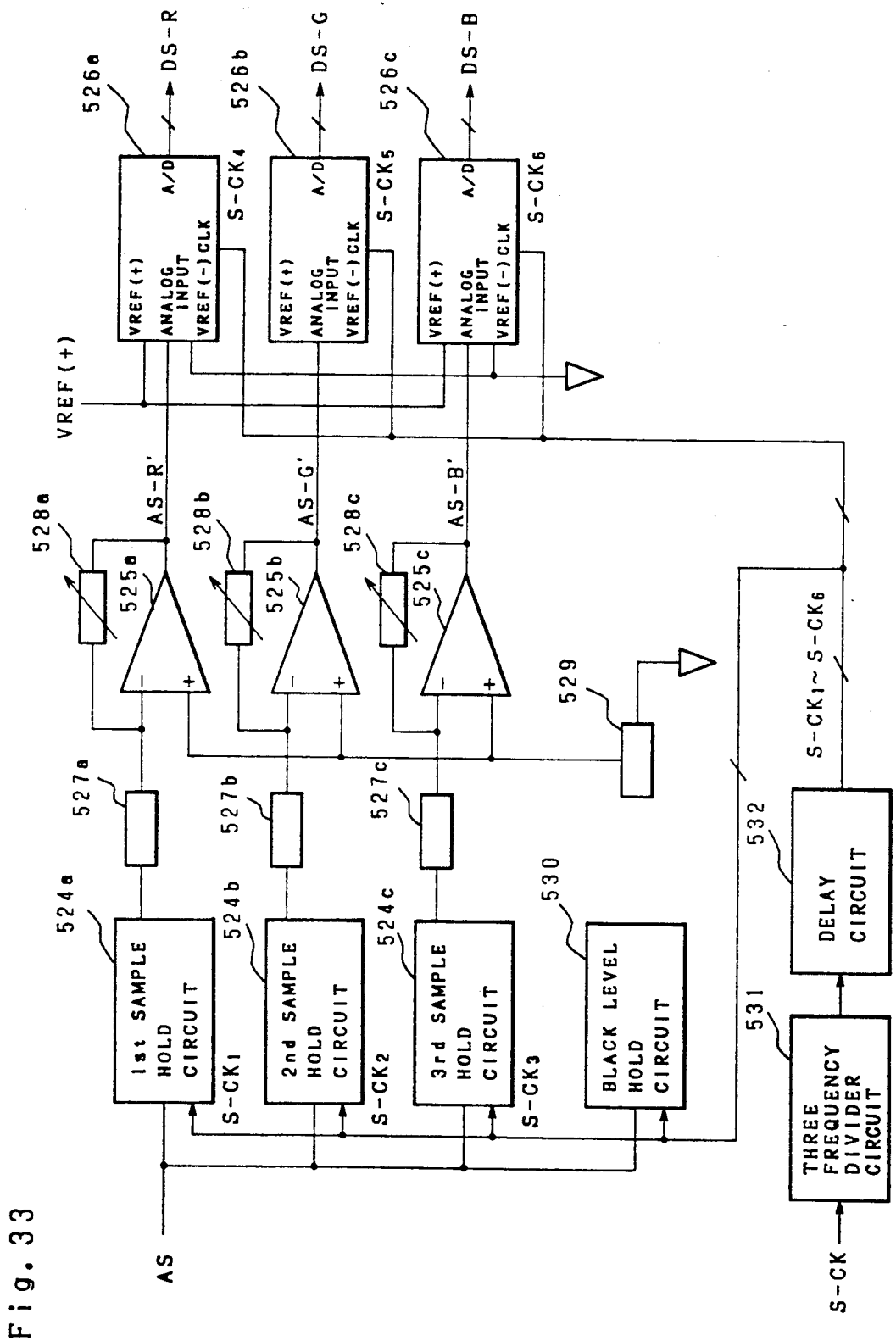
FIG. 33 is a block diagram showing relationships among a sample holding circuit, a differential amplifier circuit, an A/D converter of a fifth embodiment of the color image read apparatus in accordance with the present invention.
Figure 34:
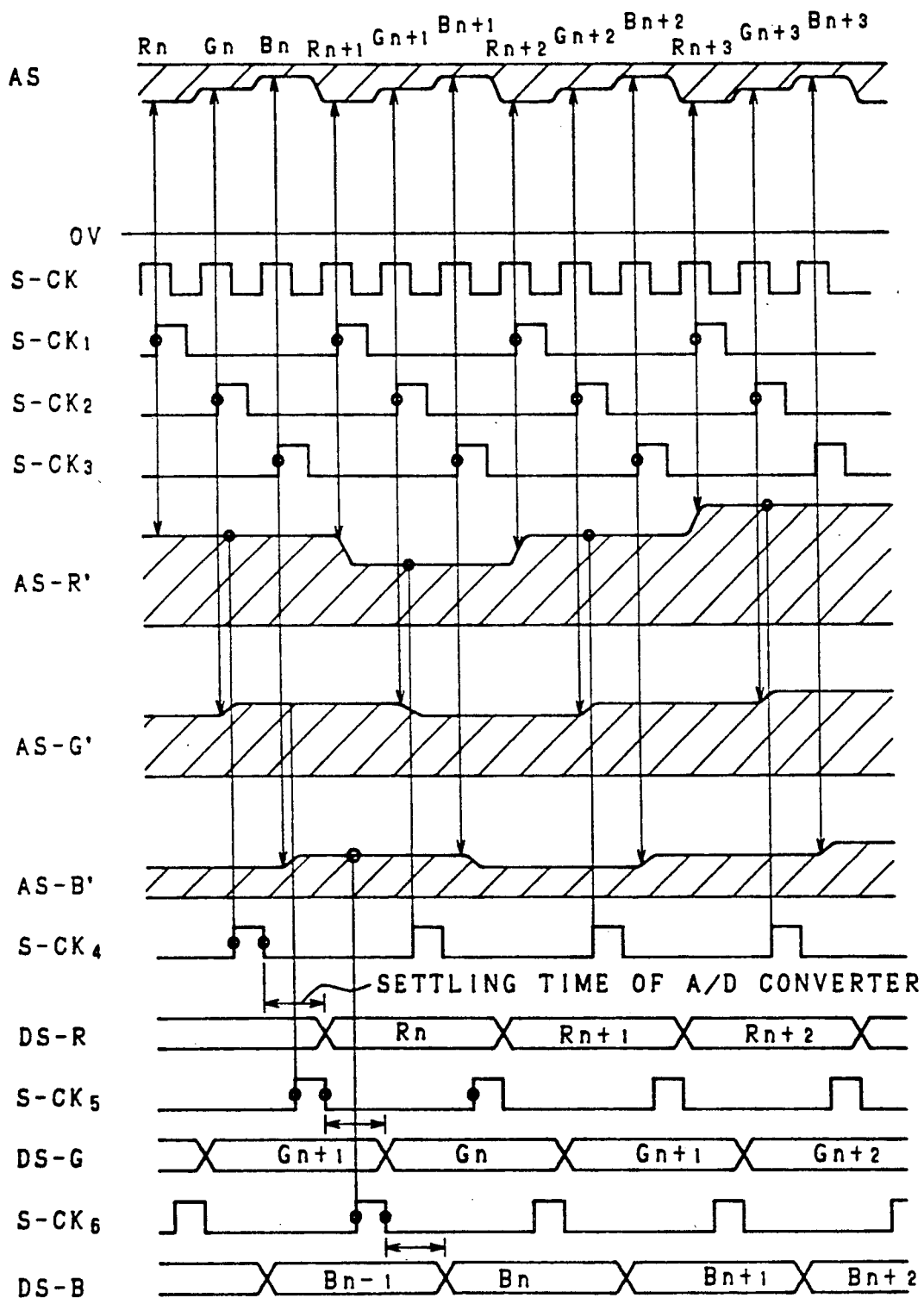
FIG. 34 is a timing chart showing relationships between an analog signal and a digital signal obtained by A/D-converting it of the fifth embodiment.

FIG. 33 is a block diagram of the fifth embodiment of the invention, in which the principal portion is shown. FIG. 34 shows the timing chart of the circuit. Sample holding circuits 524a, 524b and 524c at three stages are provided corresponding to R, G and B, which are connected one to one to A/D converters 526a, 526b and 526c through amplifiers 525a, 525b and 525c respectively. A black level holding circuit 530 is connected to the amplifiers 525a, 525b and 525c through variable resistance 529.

As shown in FIG. 24, data of three colors R, G and B are sequentially outputted. The image signal AS is the analog image signal waveform-shaped by the waveform shaping circuit 314 and serial/parallel converted sequentially to the image signals of R, G and B by the sample holding circuits 524a, 524b and 524c corresponding to the timing of clocks $S\text{-}CK_1$, $S\text{-}CK_2$ and $S\text{-}CK_3$. In other words, the first sample holding circuit 524a samples the R data of image signal AS at the leading edge of clock $S\text{-}CK_1$ and holds the same at the trailing edge. The second and third sample holding circuit 524b and 524c, similarly to the above, hold the G data and B data of image signal AS. The clocks $S\text{-}CK_1$, $S\text{-}CK_2$ and $S\text{-}CK_3$ are generated by dividing the clock S-CK coincident with the signal frequency of output signal AS1 into three frequency by three frequency divider 531 and by sequentially delaying by a delay circuit 532 corresponding to the timing of image signal AS (refer to FIG. 34).

Thus, data of R, G and B of the image signal AS is converted in parallel and inputted to amplifier circuits 525a, 525b and 525c respectively. Then differential amplification between the respective analog output signals of R, G and B. The black level holding circuit 530 holds the black level output which is to be outputted prior to the output of effective signals. The black level output is the output of the respective photodiodes D13, D14 ... D71, D72 ... D73 and D78 shown in FIG. 3. These photodiodes are masked, whereby the black level not struck by the light when in photoelectric conversion is outputted. The black level output is offset voltage for each amplifier circuit 525a, 525b and 525c and preset to 0V by adjusting the variable resistance 529 so as to be inputted into each amplifier circuit 525a, 525b and 525c. Also variable resistances 528a, 528b and 528c serve to change the amplification factor and adjust the color balance. Resistance values of variable resistances 528a, 528b and 528c are adjusted so that, when an original, such as a reference white pattern 7, of uniform density is read, the respective output signals AS-R', AS-G' and AS-B' of R, G and B are designed to be equal.

The A/D converters 526a, 526b and 526c convert the analog signals of R, G and B into 8-bit digital data DS-R, DS-G and DS-B respectively. The timing of conversion follows clocks $S\text{-}Ck_4$ to $S\text{-}CK_6$, sampling is carried out at the leading edge of each clock, and holding is carried out at the trailing edge of the same, whereby the timing of each clock $S\text{-}CK_4$ through $S\text{-}CK_6$ is set to the stable period of each analog signal.

Also, the lower limit $V_{REF}(-)$ of reference voltage of each A/D converter 526a, 526b or 526c is set to be somewhat higher than the maximum value of each output signal AS-R', AS-G' or AS-B'.

In the fifth embodiment in FIG. 33, $V_{REF}(-)$ of each A/D converter 526a, 526b or 526c is set in common, but it may alternatively be set independently. Hence, the color balance correction can be performed by setting and combing the amplification factors. In this case, when the color balance is different due to variation in manufacturing the image sensor or the light source. The $V_{REF}(+)$ value for A/D converters 526a-526c may be set at every signal even without changing the amplification factor. Also, the amplification factor and $V_{REF}(+)$ value of each A/D converter 526a, 526b or 526c are set in combination, thereby enabling fine setting.

In the aforesaid fifth embodiment, the amplification factors of amplifier circuits 525a, 525b and 525c and reference voltages $V_{REF}(+)$ and $V_{REF}(-)$ of A/D converters 526a, 526b and 526c need only be set by use of means obtaining a different value according to each signal of R, G or B.

As seen from the above, the color balance correction is performed at the earlier stage of the A/D conversion, whereby there is no need that the color balance correction is performed in the shading circuit.

In addition the components not described in the second through fifth embodiments are of the same or equivalent structure to those in the first embodiment.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An image reader comprising:
   an image sensor which reads an original to output an image data of the original,
   scanning means for moving the image sensor relatively to the original;
   a reference white pattern which is installed upstream in the scanning direction of the original and is read by the image sensor prior to the original;
   shading correction means for making shading correction for said image data, said shading correction means including;
      means for obtaining reference data from the image sensor when the image sensor reads the reference white pattern,
      a dual input/output port memory for storing the reference data, the memory being of the first-in first-out type,
      means for correcting the image data by comparing with the reference data fetched from the memory.

2. An image reader comprising:
   an image sensor which reads an original to output an image data of the original;
   scanning means for moving the image sensor relatively to the original;
   a reference white pattern which is installed upstream in the scanning direction of the original and is read by the image sensor prior to the original; and
   shading correction means for making shading correction for said image data, said shading correction means including;
      means for obtaining reference data from the image sensor when the image sensor reads the reference white pattern,
      a dual input/output port memory for storing the reference data, the memory being of the first-in first-out type in which data are read out in order from the data firstly written in,
      means for supplying to the memory both a plurality of clock signals and a signal indicative of the timing of outputtting the reference data from the memory, and
      means for correcting the image data by comparing the image data with the reference data sequentially fetched from the memory in response to the clock signals present in said signal.

3. An image reader comprising:
   an image sensor which reads an original to output an image data of the original,
   scanning means for moving the image sensor relative to the original;
   a reference white pattern which is installed upstream in the scanning direction of the original and is read by the image sensor prior to the original; and
   shading correction means for making shading correction for said image data, said shading correction means including;
      means for obtaining reference data from the image sensor when the image sensor reads the reference white pattern;
      a non-addressable memory for storing the reference data, the memory being of the first-in first-out type; and
      means for correcting the image data by comparing the image data with the reference data fetched from the memory.

4. An image reader comprising:
   an image sensor which reads an original to output an image data of the original;
   scanning means for moving the image sensor relative to the original;
   a reference white pattern which is installed upstream in the scanning direction of the original and is read by the image sensor prior to the original; and
   shading correction means for making shading correction for said image data, said shading correction means including;
      means for obtaining reference data from the image sensor when the image sensor reads the reference white pattern;
      a non-addressable memory for storing the reference data, the memory being of the first-in first-out type in which data are read out in order from the data firstly written;
      means for supplying to the memory both a plurality of clock signals and a signal indicative of the timing of outputting the reference data from the memory; and
      means for correcting the image data by comparing the image data with the reference data sequentially fetched from the memory in response to the clock signals present in said signal.

* * * * *